US012645228B2

(12) United States Patent
Fukushi et al.

(10) Patent No.: US 12,645,228 B2
(45) Date of Patent: Jun. 2, 2026

(54) CONTROL DEVICE FOR VERTICAL TAKEOFF AND LANDING AIRCRAFT

(71) Applicant: DENSO CORPORATION, Kariya-city (JP)

(72) Inventors: Masato Fukushi, Kariya-city (JP); Shun Sugita, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 18/630,205

(22) Filed: Apr. 9, 2024

(65) Prior Publication Data

US 2024/0272652 A1 Aug. 15, 2024

Related U.S. Application Data

(63) Continuation of application No. PCT/JP2022/045711, filed on Dec. 12, 2022.

(30) Foreign Application Priority Data

Jan. 17, 2022 (JP) ................................. 2022-005243

(51) Int. Cl.
$G05D$ *1/652* (2024.01)
*B64C 29/00* (2006.01)
(Continued)

(52) U.S. Cl.
CPC ......... *G05D 1/652* (2024.01); *B64C 29/0025* (2013.01); *B64D 27/34* (2024.01);
(Continued)

(58) Field of Classification Search
CPC ........ G05D 1/652; G05D 1/654; G05D 1/854; G05D 2109/254; G05D 1/82; B64D 27/34;
(Continued)

(56) References Cited

U.S. PATENT DOCUMENTS

2017/0158342 A1 6/2017 Ishii et al.
2017/0313433 A1 11/2017 Ozaki
(Continued)

FOREIGN PATENT DOCUMENTS

JP 2014-227155 A 12/2014
JP 2017047736 A * 3/2017
(Continued)

OTHER PUBLICATIONS

KR-101970601 Moon original and machine translation (Year: 2019).*
JP-2017047736 Otsuka original and machine translation (Year: 2017).*

*Primary Examiner* — Kito R Robinson
*Assistant Examiner* — Zachary E. F. Glade
(74) *Attorney, Agent, or Firm* — Oliff PLC

(57) ABSTRACT

A flight control device performs flight control processing for causing a vertical takeoff and landing aircraft to fly. When a drive device abnormality occurs during vertical takeoff, the flight control device performs a takeoff processing in flight control processing. The flight control device performs an abnormal stop processing in the takeoff processing. In the abnormal stop processing, a processing for stopping the driving of the abnormal drive device is performed. The flight control device performs a correction increase processing. In the correction increase processing, the output of at least one normal drive device is increased. In the correction increase processing, for example, the output of an adjacent drive device among a plurality of normal drive devices is increased. The adjacent drive device is a normal drive device adjacent to the abnormal drive device in a circumferential direction of a yaw axis.

11 Claims, 14 Drawing Sheets

(51) Int. Cl.

| | |
|---|---|
| *B64D 27/34* | (2024.01) |
| *B64D 31/09* | (2024.01) |
| *B64D 45/00* | (2006.01) |
| *G05D 1/654* | (2024.01) |
| *G05D 1/82* | (2024.01) |
| *G05D 1/85* | (2024.01) |
| *G05D 109/25* | (2024.01) |

(52) U.S. Cl.
CPC ............. *B64D 31/09* (2024.01); *G05D 1/654* (2024.01); *G05D 1/82* (2024.01); *G05D 1/854* (2024.01); *B64D 2045/0085* (2013.01); *G05D 2109/254* (2024.01)

(58) Field of Classification Search
CPC ............ B64D 31/09; B64D 2045/0085; B64C 29/0025
See application file for complete search history.

(56) References Cited

U.S. PATENT DOCUMENTS

| | | | | |
|---|---|---|---|---|
| 2018/0072430 A1* | 3/2018 | Misfeldt | ................ | B64D 31/16 |
| 2018/0312276 A1* | 11/2018 | Miller | ................... | B64U 10/14 |
| 2020/0010187 A1* | 1/2020 | Bevirt | ................ | B64C 29/0033 |
| 2024/0255967 A1 | 8/2024 | Takemura et al. | | |

FOREIGN PATENT DOCUMENTS

| | | | | |
|---|---|---|---|---|
| JP | 2020-117223 A | 8/2020 | | |
| KR | 101970601 B1 * | 4/2019 | ........... | B64C 11/305 |

\* cited by examiner

EPU

38

38a    OUS

36a    TS

36b    VBS

36c    NS

IS        56

VS        57

RS        55

50

40

FCD

35

FSD

FIG. 13

CONTROL DEVICE FOR VERTICAL TAKEOFF AND LANDING AIRCRAFT

CROSS REFERENCE TO RELATED APPLICATIONS

This application is a continuation application of International Patent Application No. PCT/JP2022/045711 filed on Dec. 12, 2022, which designated the U.S. and based on and claims the benefits of priority of Japanese Patent Application No. 2022-005243 filed on Jan. 17, 2022. The entire disclosure of all of the above applications is incorporated herein by reference.

TECHNICAL FIELD

The disclosure in this specification relates to a control device for a vertical takeoff and landing aircraft.

BACKGROUND

A drone flies with a plurality of rotary wings. This drone has multiple rotor blade sets. In one rotor blade set, two rotor blades are arranged one above the other.

SUMMARY

The main objective of the present disclosure is to provide a control device for a vertical takeoff and landing aircraft that can increase safety when an abnormality occurs in a drive device.

In order to achieve the above object, a disclosed aspect is a control device for a vertical takeoff and landing aircraft including a plurality of rotary blades and a plurality of drive devices that drive and rotate the rotary blades according to its own output, and being capable of vertical takeoff and landing. The control device for the vertical takeoff and landing aircraft includes an abnormality stop portion configured to stop the drive device in which an abnormality is occurred among the plurality of drive devices as an abnormal device, when the abnormality occurs in the drive device, and a correction increase portion configured to increase an output of at least one normal device, which sets the drive device in which no abnormality is occurred among the plurality of drive devices as a normal device so as to correct an attitude change of the vertical takeoff and landing aircraft due to the drive stop of the abnormal device by the abnormality stop portion.

BRIEF DESCRIPTION OF THE DRAWINGS

FIG. 2 is a block diagram showing an electrical configuration of a flight system;

FIG. 13 is a diagram for explaining a attitude of the eVTOL; and

DETAILED DESCRIPTION

Figure 1:
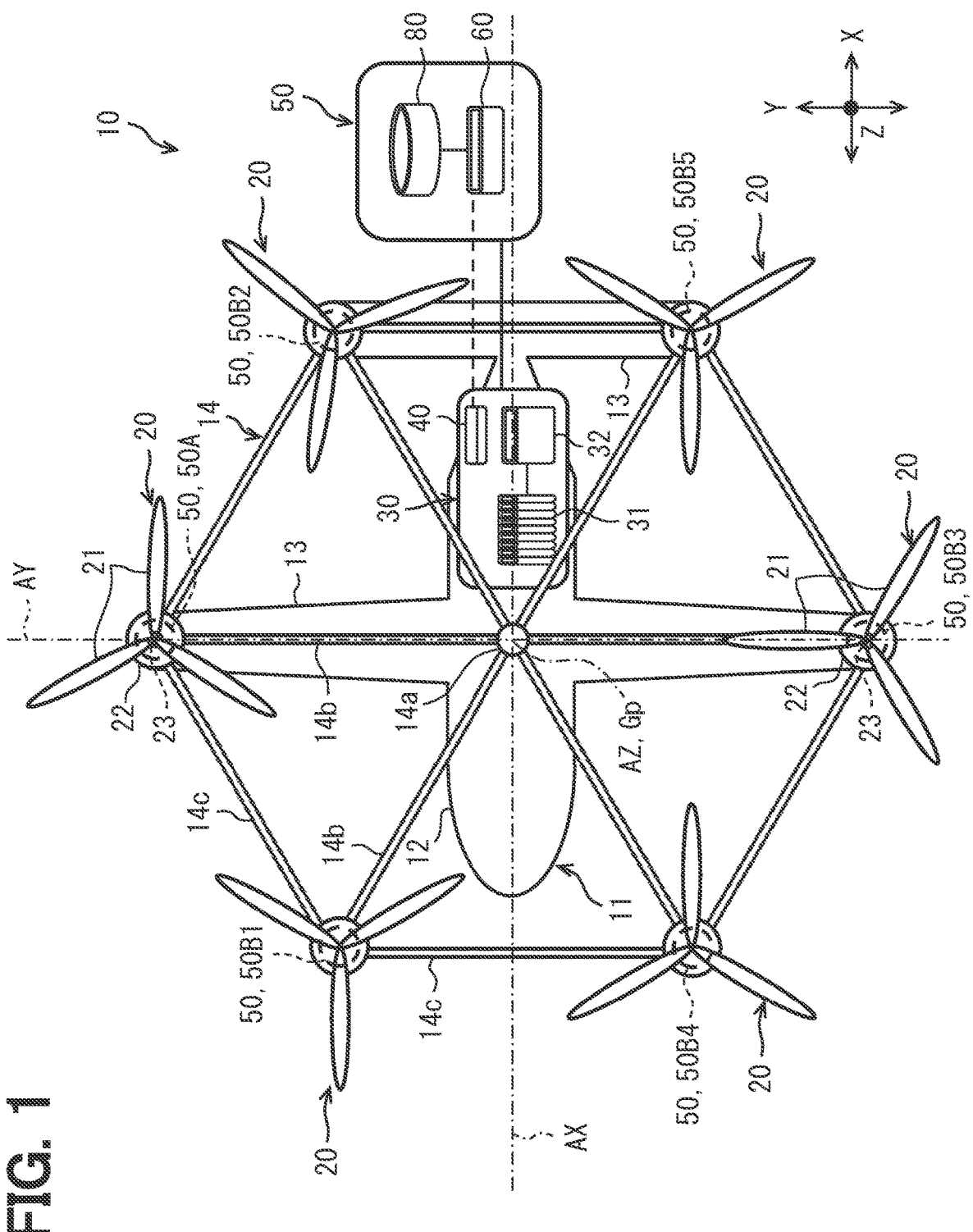
FIG. 1 is a diagram showing the configuration of an eVTOL according to a first embodiment.

In an assumable example, a drone flies with a plurality of rotary wings. This drone has multiple rotor blade sets. In one rotor blade set, two rotor blades are arranged one above the other. In this drone, when an abnormality occurs in one of the rotor blades in one rotor blade set, the rotation of one rotor blade is stopped, while the rotation of the other rotor blade is continued. Further, even in a rotor blade set different from the rotor blade set in which the abnormality has occurred, the rotation of one rotor blade is stopped, and the rotation of the other rotor blade is continued.

However, in a vertical takeoff and landing aircraft, there is a concern that the output may be insufficient if the rotor blade in which no abnormality occurs is also stopped in addition to the rotor blade in which the abnormality has occurred. In this case, a safety of the vertical takeoff and landing aircraft is likely to deteriorate.

The main objective of the present disclosure is to provide a control device for a vertical takeoff and landing aircraft that can increase safety when an abnormality occurs in a drive device.

Disclosed aspects in this specification adopt different technical solutions from each other in order to achieve their respective objectives.

In order to achieve the above object, a disclosed aspect is a control device for a vertical takeoff and landing aircraft including a plurality of rotary blades and a plurality of drive devices that drive and rotate the rotary blades according to its own output, and being capable of vertical takeoff and landing. The control device for the vertical takeoff and landing aircraft includes an abnormality stop portion configured to stop the drive device in which an abnormality is occurred among the plurality of drive devices as an abnormal device, when the abnormality occurs in the drive device, and a correction increase portion configured to increase an output of at least one normal device, which sets the drive device in which no abnormality is occurred among the plurality of drive devices as a normal device so as to correct an attitude change of the vertical takeoff and landing aircraft due to the drive stop of the abnormal device by the abnormality stop portion.

According to the above aspect, among the plurality of drive devices, the abnormal device in which the abnormality has occurred is stopped, while the output of at least one normal device is increased. With this configuration, even if the overall output of the vertical takeoff and landing aircraft decreases due to the drive stop of the abnormal device, it is possible to compensate for the decrease by increasing the output of the normal device. Moreover, since the increase in the output of the normal device is performed to correct the change in attitude of the vertical takeoff and landing aircraft due to the drive stop of the abnormal device, it is possible to suppress the attitude of the vertical takeoff and landing aircraft from becoming unstable. Therefore, safety can be improved when an abnormality occurs in the drive device in the vertical takeoff and landing aircraft.

The following will describe embodiments for carrying out the present disclosure with reference to the drawings. In each of the embodiments, the same reference numerals are assigned to portions corresponding to the items described in the preceding embodiments, and a repetitive description of the corresponding portions may be omitted. In each embodiment, when only a part of the configuration is described, another embodiment previously described can be employed for other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A flight system 30 shown in FIG. 1 is mounted on an eVTOL 10. The eVTOL 10 is an electric vertical takeoff and landing aircraft. The electric vertical takeoff and landing aircraft is an electric vertical takeoff and landing aircraft that can take off and land vertically. The eVTOL is an abbreviation for electric Vertical Takeoff and Landing aircraft. The eVTOL 10 is an electric flying vehicle that flies in the atmosphere. The eVTOL 10 is also an electric aircraft and is sometimes referred to as an electric aircraft. The eVTOL 10 is an aircraft operated by a pilot. An operator of the eVTOL 10 include a pilot and a remote pilot. The pilot is a crew member riding on the eVTOL 10. The remote pilot remotely operates the eVTOL 10 without riding on the eVTOL 10. The flight system 30 is a system driven to fly the eVTOL 10.

The eVTOL 10 includes an airframe 11 and a rotor 20. The airframe 11 has a fuselage body 12, wings 13, and a fuselage frame 14. The fuselage body 12 is a body of the airframe 11 and has, for example, a shape extending in a front-rear direction. The fuselage body 12 may have a cockpit when a pilot rides therein. The wings 13 extend from the fuselage body 12. Although a plurality of wings are provided in the fuselage body 12, they may not be provided. The multiple wings 13 include main wings, tail wings, and the like.

In the eVTOL 10, the fuselage body 12 extends along a roll axis AX. In the eVTOL 10, the roll axis AX extends in the front-rear direction of the airframe 11, a pitch axis AY extends in a width direction of the airframe 11, and a yaw axis AZ extends in a vertical direction of the airframe 11. The roll axis AX, the pitch axis AY, and the yaw axis AZ are orthogonal to each other, and all axes pass through a center of gravity Gp of the aircraft. A center of gravity Gp is the center of gravity of the eVTOL 10, for example, the center of gravity of the eVTOL 10 at empty weight. In the eVTOL 10, the roll axis AX extends in a X direction, the pitch axis AY extends in a Y direction, and the yaw axis AZ extends in a Z direction.

The rotor 20 is provided on the airframe 11. The rotor 20 rotates about a rotor axis. The rotor axis is a rotation axis of the rotor 20 and coincides with a center line of the rotor 20. The rotor 20 is a rotor wing, and can generate thrust and lift on the eVTOL 10. The rotor axis extends, for example, in the Z direction. A force generated when the eVTOL 10 rises is sometimes referred to as thrust. The eVTOL 10 is sometimes referred to as a multi-thrust distributed electric aircraft.

The rotor 20 includes a blade 21, a rotor head 22, and a rotor shaft 23. A plurality of blades 21 are arranged in the circumferential direction of the rotor axis. The rotor head 22 couples the multiple blades 21. The blades 21 extend from the rotor head 22 in the radial direction of the rotor axis. The blades 21 are vanes that rotate together with the rotor shaft 23. The rotor shaft 23 is a rotation shaft of the rotor 20 and extends from the rotor head 22 along the rotor axis.

The rotor 20 is fixed to at least one of the fuselage body 12 and the wings 13 via the fuselage frame 14. The fuselage frame 14 is fixed to at least one of the fuselage body 12 and the wings 13. The fuselage frame 14 of the present embodiment is fixed to the fuselage body 12. The fuselage frame 14 has a support column 14a, a radial frame 14b, and a circumferential frame 14c. The support column 14a extends in the Z direction along the yaw axis AZ, and is fixed to the fuselage body 12. The support column 14a is provided, for example, at a position where the center line of the support column 14a and the yaw axis AZ coincide. A plurality of radial frames 14b extend in the radial direction of the yaw axis AZ, and are arranged in the circumferential direction of the yaw axis AZ. The circumferential frame 14c extends in the circumferential direction of the yaw axis AZ, and a plurality of circumferential frames 14c are arranged in the circumferential direction. The circumferential frame 14c connects two adjacent radial frames 14b in the circumferential direction of the yaw axis AZ.

The support column 14a may be fixed to the wing 13. Further, a plurality of support columns 14a may be provided. Furthermore, the radial frame 14b and the circumferential frame 14c may be directly fixed to at least one of the fuselage body 12 and the wing 13 without using the support columns 14a.

Multiple rotors 20 are provided on the airframe 11. The plurality of rotors 20 are arranged in the circumferential direction of the yaw axis AZ. The rotor 20 is fixed to at least one of the radial frame 14b and the circumferential frame 14c. The rotor 20 is provided, for example, at a connecting portion between the radial frame 14b and the circumferential frame 14c. The plurality of rotors 20 include a plurality of pairs of rotors 20 that are lined up in the radial direction of the yaw axis AZ with the yaw axis AZ interposed therebetween. The eVTOL 10 is a multicopter having at least three rotors 20. For example, at least four rotors 20 are provided in the airframe 11. In the eVTOL 10 of the present embodiment, for example, six rotors 20 are arranged at equal intervals in the circumferential direction of the yaw axis AZ.

Flight modes of the eVTOL 10 include vertical takeoff, vertical landing, cruise, hovering, and the like. The eVTOL 10 can take off from a takeoff point by vertical takeoff, for example, by rising vertically without taxiing. The eVTOL 10 can perform vertical landing, for example, by descending in the vertical direction and landing at a landing site without sliding. The eVTOL 10 can fly as a cruise, for example, moving in the horizontal direction. The eVTOL 10 can hover, for example, fly as if it were stopped at a predetermined position in the air.

The eVTOL 10 can fly using thrust generated by the drive rotation of the rotor 20. In the eVTOL 10, the flight mode of the eVTOL 10 is changed by changing the driving mode of the rotor 20. When the eVTOL 10 is a tilt rotor type aircraft, the flight mode of the eVTOL 10 can be changed by changing the tilt angle of the rotor 20. In the tilt rotor type aircraft, the rotor 20 serves as both a cruise rotor and a lift rotor. The cruise rotor enables the eVTOL 10 to cruise. The lift rotor enables vertical takeoff, vertical landing, and hovering of the eVTOL 10. On the other hand, the eVTOL 10 may include a cruise rotor 20 and a lift rotor 20 separately.

Figure 2:
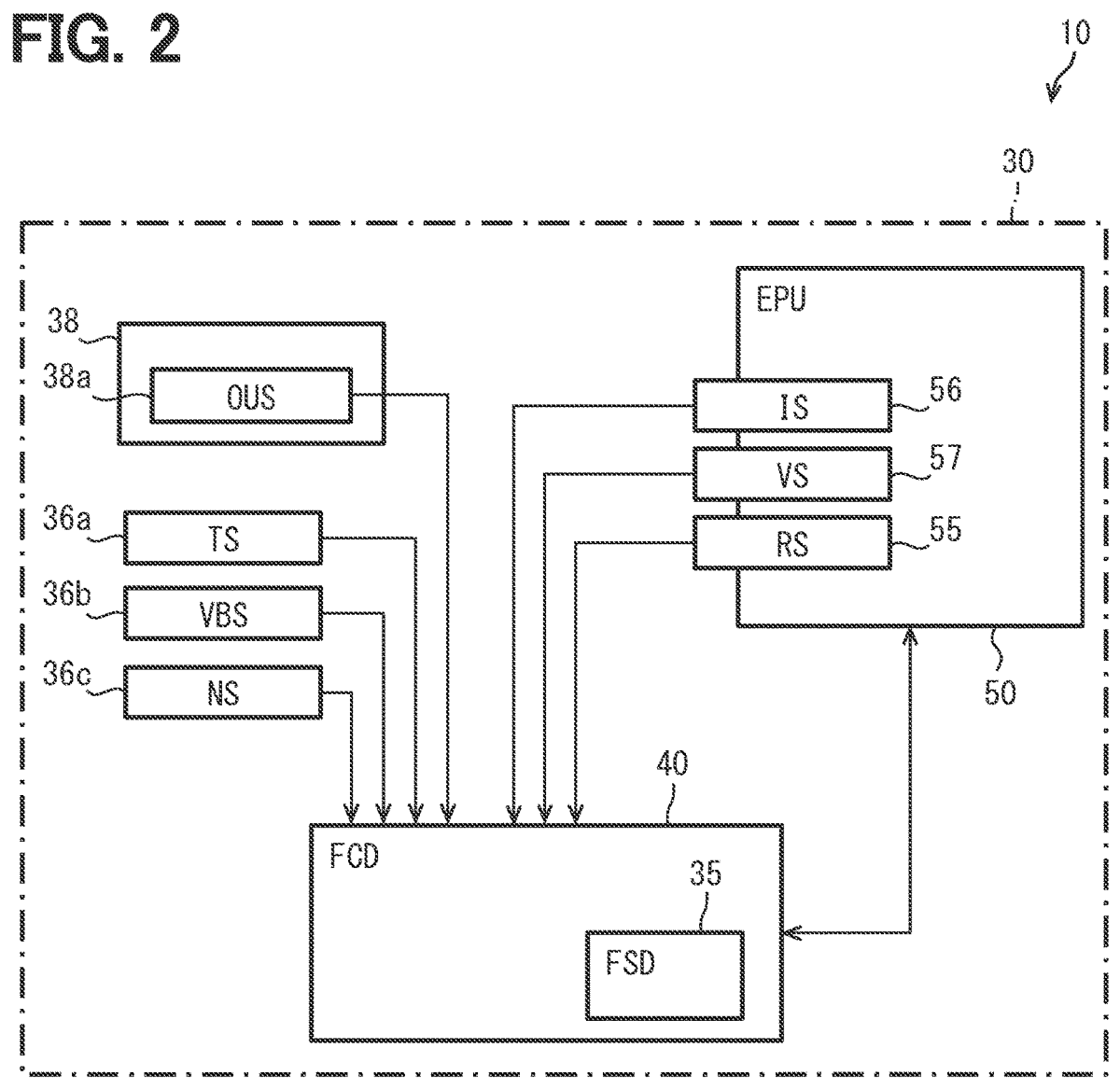

As shown in FIGS. 1 and 2, the flight system 30 includes a drive battery 31, a distributor 32, a flight control device 40, and an EPU 50. The flight system 30 also includes a temperature sensor 36*a*, a vibration sensor 36*b*, an abnormal noise sensor 36*c*, and an operation sensor 38*a*. The EPU 50 includes a rotation sensor 55, a current sensor 56, and a voltage sensor 57. The flight control device 40 includes a storage device 35. In FIG. 2, the storage device 35 is denoted as FSD, the flight control device 40 is denoted as FCD, the temperature sensor 36*a* is denoted as TS, the vibration sensor 36*b* is denoted as VBS, the abnormal noise sensor 36*c* is denoted as NS, and the operation sensor 38*a* is denoted as OUS. In the EPU 50, the rotation sensor 55 is denoted by RS, the current sensor 56 is denoted by IS, and the voltage sensor 57 is denoted by VS.

The EPU 50 is a device that drives the rotor 20 to rotate, and corresponds to a drive device. The EPU is an abbreviation for electric propulsion unit. The EPU 50 is an electric type drive device, and is sometimes referred to as an electric drive device. The EPU 50 can propel the eVTOL 10 by driving and rotating the rotor 20, and is sometimes referred to as a propulsion device.

The EPU 50 is individually provided for each of the multiple rotors 20. The EPU 50 is aligned with the rotor 20 along the rotor axis. Each of the multiple EPUs 50 is fixed to the airframe 11. The EPU 50 rotatably supports the rotor 20. The EPU 50 is mechanically connected to the rotor shaft 23. The multiple EPUs 50 include at least one of the EPU 50 fixed to the airframe 11 in a state of protruding outside the airframe 11 and the EPU 50 fixed to the airframe 11 in a state of being embedded inside the airframe 11.

The EPU 50 includes a motor device 80 and an inverter device 60. The motor device 80 includes a motor and a motor housing. The motor is housed in the motor housing. The motor is a multi-phase AC motor, for example, a three-phase AC rotary electric machine. The motor functions as an electric motor that is a flight driving source of the eVTOL 10. The motor includes a rotor and a stator. The motor is driven by electric power of the drive battery 31. In the EPU 50, a rotation shaft of the motor is connected to the rotor 20, and the rotor 20 rotates when the rotation shaft of the motor rotates. By driving of the motor, the EPU 50 drives the rotor 20 to rotate. As the motor, for example, a brushless motor is used. As the motor, an induction motor or a reactance motor may be used.

The inverter device 60 includes an inverter and an inverter housing. The inverter is housed in the inverter housing. The inverter drives the motor by converting electric power to be supplied to the motor. The inverter may be referred to as a drive unit. The inverter converts the electric power to be supplied to the motor from a direct current to an alternating current. The inverter is an electric power conversion unit that converts the electric power. The inverter is a multi-phase electric power conversion unit, and performs electric power conversion for each of the multiple phases. The inverter is, for example, a three-phase inverter. The motor is driven according to a voltage and a current supplied from the inverter.

In the EPU 50, the driving of the motor device 80 is controlled according to detection results of the sensors 55 to 57 and the like. For example, the EPU 50 includes a drive control unit that controls driving of the motor device 80. The drive control unit is electrically connected to the inverter and the sensors 55 to 57. The sensors 55 to 57 output detection results to the drive control unit. The drive control unit performs motor control via the inverter. The drive control unit is electrically connected to the flight control device 40, and performs motor control according to a signal from the flight control device 40. The flight control device 40 may directly control the motor and the like for the EPU 50.

The rotation sensor 55 is provided for the motor. The rotation sensor 55 detects the number of rotations of the motor. The rotation sensor 55 includes, for example, an encoder and a resolver. The number of rotations of the motor is, for example, the number of rotations per unit time. The current sensor 56 detects a current flowing through the motor as a motor current. The current sensor 56 detects a motor current for each of the multiple phases, for example. The voltage sensor 57 detects the voltage output from the inverter as an inverter voltage. The rotation sensor 55, the current sensor 56, and the voltage sensor 57 are electrically connected to the flight control device 40, and output detection signals to the flight control device 40.

The temperature sensor 36*a*, the vibration sensor 36*b*, and the noise sensor 36*c* detect a state of the EPU 50. The sensors 36*a* to 36*c* may be provided in the EPU 50, or may be provided at a position apart from the EPU 50, as long as they can detect the driving state of the EPU 50. The sensors 36*a* to 36*c* are individually provided in each of the plurality of EPUs 50. One each of sensors 36*a* to 36*c* may be provided for several EPUs 50. For example, the sensors 36*a* to 36*c* may be provided at the front and rear ends of the fuselage body 12 and the tips of the main wings, respectively. In this configuration, among the plurality of EPUs 50, the driving state of the EPU 50 located near the sensors 36*a* to 36*c* is detected by the sensors 36*a* to 36*c*.

The temperature sensor 36*a* detects the temperature of the EPU 50. The temperature sensor 36*a* of the present embodiment detects the temperature of the motor device 80 as the temperature of the EPU 50. For example, the temperature sensor 36*a* is provided at a position closer to the motor device 80 than the inverter device 60 with respect to the EPU 50. The temperature sensor 36*a* may be provided at a position closer to the inverter device 60 than the motor device 80, or may be provided between the motor device 80 and the inverter device 60. In this case, the temperature sensor 36*a* can detect the temperature of the inverter device 60 or the average temperature of the motor device 80 and the inverter device 60 as the temperature of the EPU 50.

The vibration sensor 36*b* detects vibrations of the EPU 50. The vibration sensor 36*b* of the present embodiment detects the vibration of the motor device 80 as the vibration of the EPU 50. The vibration sensor 36*b* detects vibrations generated as the motor device 80 is driven. The vibration sensor 36*b* is capable of detecting the amplitude and frequency of vibration. The vibration sensor 36*b* includes, for example, at least one of an acceleration sensor, a load sensor, a speed sensor, and a displacement sensor.

The abnormal noise sensor 36*c* detects an abnormal noise from the EPU 50. The abnormal noise sensor 36*c* of the present embodiment detects the abnormal noise from the motor device 80 as the abnormal noise of the EPU 50. The abnormal noise sensor 36*c* is capable of detecting the abnormal noise as a sound when the abnormal noise is generated as the motor device 80 is driven. The abnormal noise sensor 36*c* includes a sound sensor such as a microphone. The abnormal sound sensor 36*c* is capable of detecting the amplitude and frequency of sound.

The temperature sensor 36*a*, the vibration sensor 36*b*, and the abnormal noise sensor 36*c* are electrically connected to the flight control device 40 and output a detection signal to the flight control device 40. The detection results of the sensors 36*a* to 36*c* may include information indicating the state of the eVTOL 10 in addition to information indicating the state of the EPU 50. For example, the detection result of the vibration sensor 36*b* may include vibrations of the airframe 11 that occur as the eVTOL 10 flies, in addition to vibrations that occur as the EPU 50 is driven. The detection result of the abnormal noise sensor 36*c* may include, in addition to the sound generated as the EPU 50 is driven, the sound of the wind generated as the eVTOL 10 flies.

The flight system 30 has an operation portion 38. The operation portion 38 is an object to be operated such as an operating lever, and is operated by a pilot or the like. The operation portion 38 is provided in the passenger compartment of the eVTOL 10. The operation sensor 38*a* is provided in the operation portion 38. The operation sensor 38*a* can detect that the operation portion 38 has been operated and an operation mode for the operation portion 38. The operation sensor 38*a* is electrically connected to the flight control device 40 and outputs a detection signal to the flight control device 40.

The drive battery 31 is electrically connected to the multiple EPUs 50. The drive battery 31 is an electric power supply unit that supplies electric power to the EPU 50, and corresponds to a power supply unit. The drive battery 31 is a battery for driving the EPU 50, and may be referred to as a drive dedicated battery. The drive battery 31 is a DC voltage source that applies a DC voltage to the EPU 50. The drive battery 31 includes a rechargeable secondary battery. Examples of the secondary battery include a lithium-ion battery and a nickel-hydrogen battery. The drive battery 31 can store electric power, and corresponds to a power storage device. The drive battery 31 includes multiple cells. The cells are storage batteries constituting the drive battery 31. The drive battery 31 is referred to as an assembled battery, and the cells may be referred to as battery cells.

The distributor 32 is electrically connected to the drive battery 31 and the multiple EPUs 50. The distributor 32 distributes electric power from the drive battery 31 to the multiple EPUs 50. The drive battery 31 is electrically connected to the multiple EPUs 50 via the distributor 32. The drive battery 31 supplies electric power to the EPU 50 via the distributor 32. When a voltage of the drive battery 31 is referred to as a high voltage, the high voltage is applied to the inverter described later in the EPU 50. The distributor 32 may be omitted as long as the electric power of the drive battery 31 is supplied to the multiple EPUs 50. As the configuration in which the distributor 32 may be omitted, for example, there is a configuration in which each of the multiple EPUs 50 is individually provided with the power supply unit.

The flight control device 40 illustrated in FIG. 2 is, for example, an ECU, and performs flight control for causing the eVTOL 10 to fly. The flight control device 40 is a control device that controls the flight system 30, and controls, for example, the EPU 50. The ECU is an abbreviation for electronic control unit. The flight control device 40 is mainly implemented by a microcomputer including, for example, a processor, a memory, an I/O, and a bus that connects these components. The microcomputer may be referred to as a micro computer. The memory is a non-transitory tangible storage medium that non-temporarily stores computer readable programs and data. The non-transitory tangible storage medium is implemented by a semiconductor memory, a magnetic disk, or the like.

The flight control device 40 is electrically connected to the EPU 50. The flight control device 40 executes a control program stored in at least one of the memory and the storage device 35 to execute various types of processing related to the flight control. The flight control device 40 performs the flight control according to detection results of various sensors and the like. The various sensors include the current sensor 56 and the temperature sensor 36*a*. This flight control includes EPU control that drives and controls the EPU 50. The EPU control is also output control that controls the output of EPU 50. The storage device 35 stores information related to the flight control such as a control program. The various sensors include the rotation sensor 55, the current sensor 56, the voltage sensors 57, and the like. The storage device 35 may be provided independently of the flight control device 40. In this case, it is preferable that the storage device 35 and the flight control device 40 can communicate with each other.

The flight control device 40 performs the flight control processing for causing the eVTOL 10 to fly. The flight control device 40 controls the drive rotation of the rotor 20 via, for example, the EPU 50 in the flight control processing. The eVTOL 10 corresponds to a vertical takeoff and landing aircraft, and the flight control device 40 corresponds to a control device for the vertical takeoff and landing aircraft. The flight control device 40 may be referred to as a flight controller.

The flight control processing will be described with reference to the flowchart of FIG. 3. The flight control device 40 repeatedly executes the flight control processing at a predetermined control cycle. The flight control device 40 has a function of executing processing of each step of the flight control processing.

Figure 3:
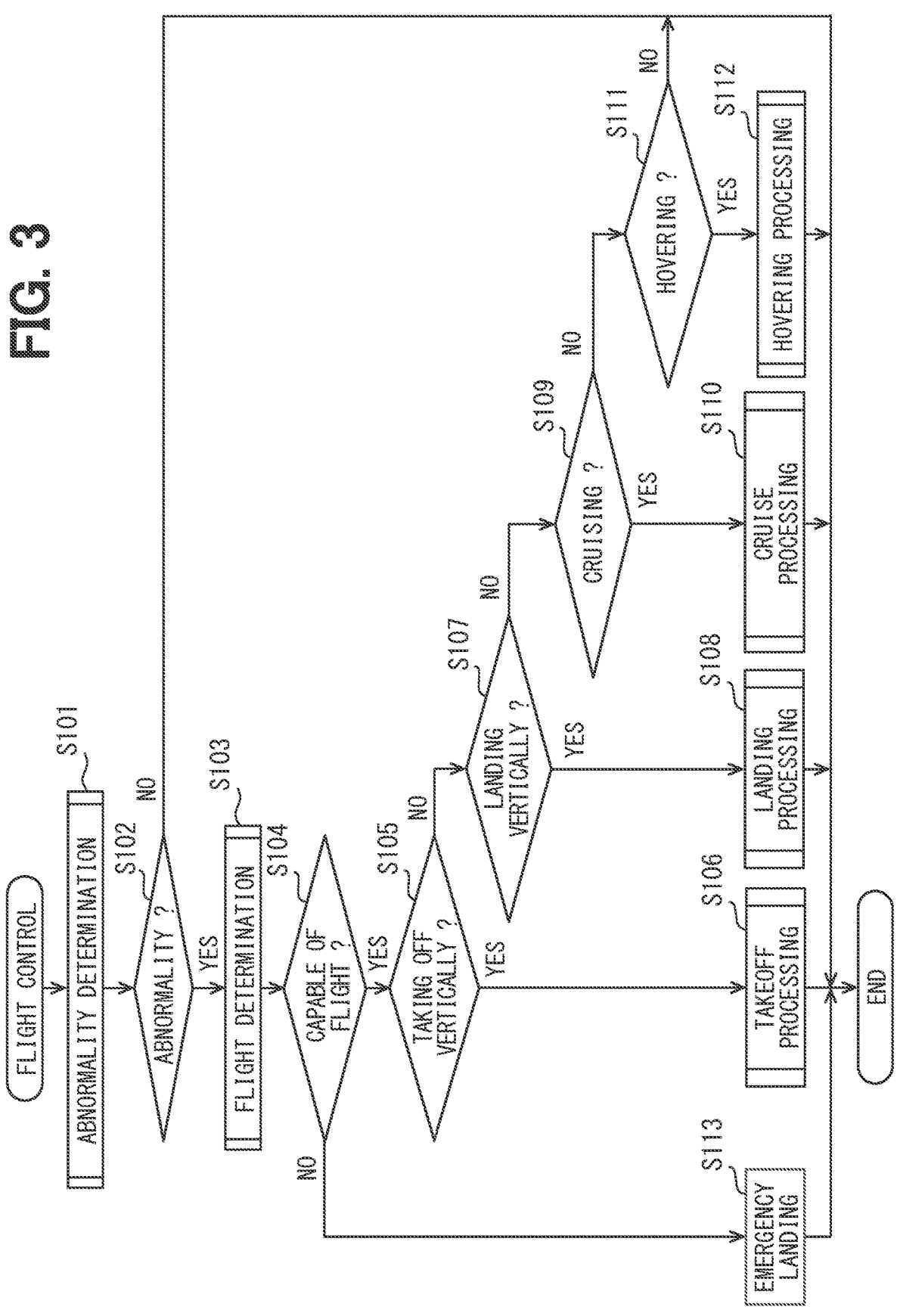
FIG. 3 is a flowchart showing a procedure of flight control processing.

The flight control device 40 performs an abnormality determination processing in step S101 shown in FIG. 3. In the abnormality determination processing, it is determined whether or not an abnormality has occurred in the eVTOL 10. Examples of abnormalities in the eVTOL 10 include an abnormality in the EPU 50, an abnormality in the motor device 80, and an abnormality related to the flight attitude of the eVTOL 10. The abnormality determination processing will be explained with reference to the flowchart in FIG. 4.

Figure 4:
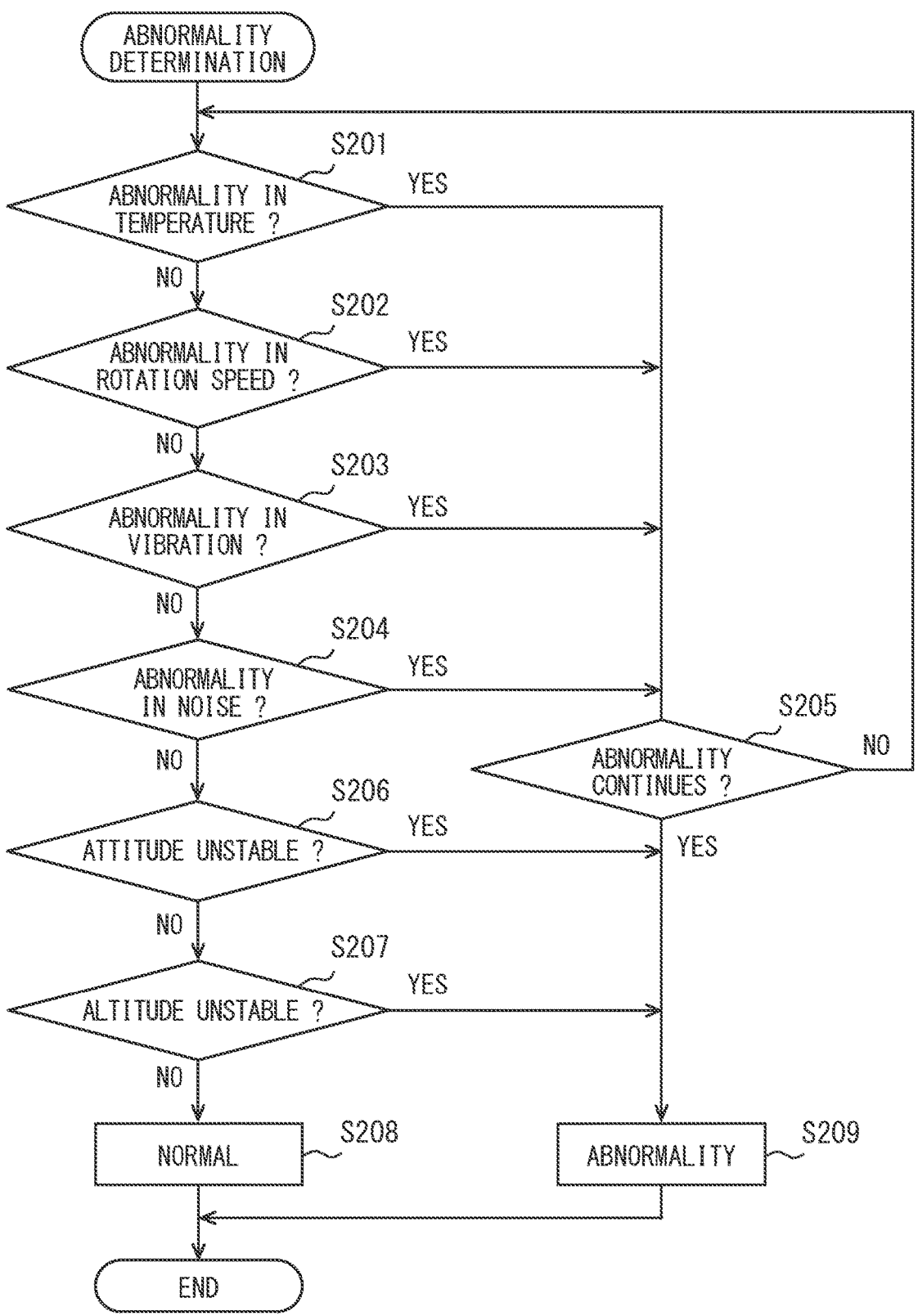
FIG. 4 is a flowchart showing a procedure of abnormality determination processing.

The flight control device 40 performs EPU abnormality determination in steps S201 to S205 shown in FIG. 4. In the EPU abnormality determination, it is determined whether an abnormality has occurred in the EPU 50 or not. Examples of abnormalities in the EPU 50 include motor abnormality and inverter abnormality. The motor abnormality is the abnormality of the motor device 80, and the inverter abnormality is the abnormality of the inverter device 60. The flight control device 40 performs EPU abnormality determination for each of the plurality of EPUs 50. The inverter abnormality determination is also a determination as to whether or not an abnormality has occurred in the EPU 50.

In step S201, the flight control device 40 determines whether or not there is an abnormality in the temperature of the EPU 50. For example, the flight control device 40 determines whether or not there is an abnormality in the motor temperature. In this determination, it is determined whether the motor temperature is within the permissible range. In this determination, it is determined that an abnormality has occurred in the motor temperature both when the motor temperature is higher than the allowable range and when the motor temperature is lower than the allowable range. The motor temperature is the temperature of the motor device 80, and is obtained using, for example, a detection signal from the temperature sensor 36*a*. The allowable range of motor temperature is determined in advance and stored in the storage device 35. For example, when there is an abnormality in the motor temperature, the flight control device 40 determines that there is an abnormality in the temperature of the EPU 50. The allowable range of the motor temperature may be variably set depending on the outside temperature or the like.

In step S202, the flight control device 40 determines whether or not there is an abnormality in the motor rotation speed of the EPU 50. In this determination, it is determined whether the motor rotation speed is within an allowable range. In this determination, it is determined that an abnormality has occurred in the motor rotation speed both when the motor rotation speed is higher than the allowable range and when the motor rotation speed is lower than the allowable range. The motor rotation speed is the rotation speed of a motor included in the motor device 80, and is obtained using, for example, a detection signal from the rotation sensor 55. The allowable range of motor rotation speed is determined in advance and stored in the storage device 35. The allowable range of the motor rotation speed may be variably set according to the flight speed of the eVTOL 10, etc.

In step S203, the flight control device 40 determines whether there is any abnormality in the vibration of the EPU 50. For example, the flight control device 40 determines whether or not there is an abnormality in the vibration of the motor device 80. In this determination, it is determined whether the vibration mode of the motor device 80 is within the allowable range. In this determination, if the vibration mode of the motor device 80 is out of the allowable range, it is determined that an abnormality has occurred in the vibration mode of the motor device 80. Regarding the vibration of the motor device 80, for example, when at least one of the amplitude and the frequency is outside the allowable range, it is determined that the vibration mode is outside the allowable range. The vibration of the motor device 80 is acquired using the detection signal of the vibration sensor 36*b*. The allowable range of the vibration mode is determined in advance and stored in the storage device 35. For example, when there is an abnormality in the vibrations of the motor device 80, the flight control device 40 determines that there is an abnormality in the vibrations of the EPU 50. The allowable range of the vibration mode may be variably set depending on the flight speed of the eVTOL 10 and the like.

In step S204, the flight control device 40 determines whether there is any abnormality in the noise from the EPU 50. For example, the flight control device 40 determines whether or not the motor device 80 is making an abnormal noise. In this determination, it is determined whether the sound of the motor device 80 is included in the allowable range of abnormal noise. In this determination, when the sound of the motor device 80 is outside the allowable range, the sound is determined to be an abnormal sound. Regarding the sound of the motor device 80, for example, when at least one of the amplitude and the frequency is outside the allowable range, it is determined that the sound is outside the allowable range. The sound of the motor device 80 is acquired using the detection signal of the abnormal noise sensor 36*c*. The allowable range of abnormal noise is determined in advance and stored in the storage device 35. For example, when the motor device 80 is making an abnormal noise, the flight control device 40 determines that the EPU 50 is making an abnormal noise. The allowable range of sound may be variably set depending on the flight speed of the eVTOL 10 and the like.

In the EPU abnormality determination, when any one of the abnormality of the temperature change, the rotation speed change, and the vibration change, and the abnormal noise occurs, it is determined that an abnormality has occurred in the EPU 50 such as the motor device 80, and the flight control device 40 proceeds to step S205. In step S205, the flight control device 40 determines whether the abnormality in the EPU 50 continues. In this determination, it is determined whether the abnormality time during which the abnormality of the EPU 50 continues has reached a reference time. The reference time is set to, for example, several tens of seconds to several minutes. The reference time is determined in advance and stored in the storage device 35. The reference time may be variably set depending on the outside temperature, the flight speed of the eVTOL 10, and the like.

When the abnormality time of the EPU 50 reaches the reference time, the flight control device 40 determines that an abnormality has occurred in the EPU 50, and proceeds to step S209. The flight control device 40 performs the abnormality processing in step S209. In this abnormality processing, the abnormality information including information indicating that an abnormality has occurred in the EPU 50 and which EPU 50 has experienced the abnormality is stored in the storage device 35 or the like. For example, the flight control device 40 sets an EPU abnormality flag indicating that an abnormality has occurred in the EPU 50 in the storage device 35 or the like in association with position information indicating the position of the EPU 50 where the abnormality has occurred.

When the abnormality time of the EPU 50 has not reached the reference time, the flight control device 40 determines that although something extraordinary occurs in the EPU 50, no abnormality has occurred in the EPU 50, and returns to step S201 to perform EPU abnormality determination.

In the EPU abnormality determination, when any one of no abnormality of the temperature change, the rotation speed change or the vibration change, or the abnormal noise has occurred, the flight control device 40 proceeds to step S206. In step S206, the flight control device 40 determines whether an attitude of the eVTOL 10 is unstable. In this determination, it is determined whether or not the attitude of the eVTOL 10 is maintained in a normal attitude, and when the attitude of the eVTOL 10 is maintained in a normal attitude, it is determined that the attitude of the eVTOL 10 is stable. Furthermore, even if the eVTOL 10 is kept in a specific attitude, when the specific attitude is not a normal attitude, it is determined that the eVTOL 10 is unstable. The flight system 30 has an attitude sensor, and in step S206, the attitude of the eVTOL 10 is acquired by the attitude sensor or the like.

When the attitude of the eVTOL 10 is unstable, the flight control device 40 proceeds to step S209 and executes the abnormality processing. In the abnormality processing in this case, the abnormality information indicating that the attitude of the eVTOL 10 is unstable is stored in the storage device 35 or the like. For example, the flight control device 40 sets an attitude abnormality flag indicating that the attitude of the eVTOL 10 is unstable in the storage device 35 or the like.

When the attitude of the eVTOL 10 is not unstable, the flight control device 40 proceeds to step S207. In step S207, the flight control device 40 determines whether an altitude of the eVTOL 10 is unstable. In this determination, it is determined whether the altitude of the eVTOL 10 is at a normal altitude. In this determination, for example, it is determined whether or not the altitude of the eVTOL 10 is maintained at the normal altitude, and when the altitude of the eVTOL 10 is maintained at the normal altitude, it is determined that the altitude of the eVTOL 10 is stable. For example, when the eVTOL 10 is repeatedly ascending and descending, it is determined that the altitude of the eVTOL 10 is unstable. The flight system 30 has an altitude sensor, and in step S207, the altitude of the eVTOL 10 is acquired by the altitude sensor or the like.

When the altitude of the eVTOL 10 is unstable, the flight control device 40 proceeds to step S209 and executes the abnormality processing. In the abnormality processing in this case, the abnormality information indicating that the altitude of the eVTOL 10 is unstable is stored in the storage device 35 or the like. For example, the flight control device 40 sets an altitude abnormality flag indicating that the altitude of the eVTOL 10 is unstable in the storage device 35 or the like.

When neither the attitude nor the altitude of the eVTOL 10 is unstable, the flight control device 40 determines that no abnormality has occurred in the eVTOL 10, and proceeds to step S208. The flight control device 40 performs the normal processing in step S208. In this normal processing, the normal information indicating that no EPU abnormality, attitude abnormality, or altitude abnormality has occurred is stored in the storage device 35 or the like.

Returning to FIG. 3, after the abnormality determination processing, the flight control device 40 proceeds to step S102. The flight control device 40 determines whether an abnormality has occurred in the eVTOL 10 in step S102. In this determination, it is determined whether the abnormality flags such as an EPU abnormality flag, an attitude abnormality flag, and an altitude abnormality flag are set. When the abnormality flag is set, it is determined that an abnormality has occurred in the eVTOL 10.

When the abnormality has occurred in the eVTOL 10, the flight control device 40 proceeds to step S103. The flight control device 40 performs the flight determination processing in step S103. In the flight determination processing, when an abnormality has occurred in the eVTOL 10, it is determined whether or not it is possible to fly the eVTOL 10. The flight state determination processing will be explained with reference to the flowchart in FIG. 5.

Figure 5:
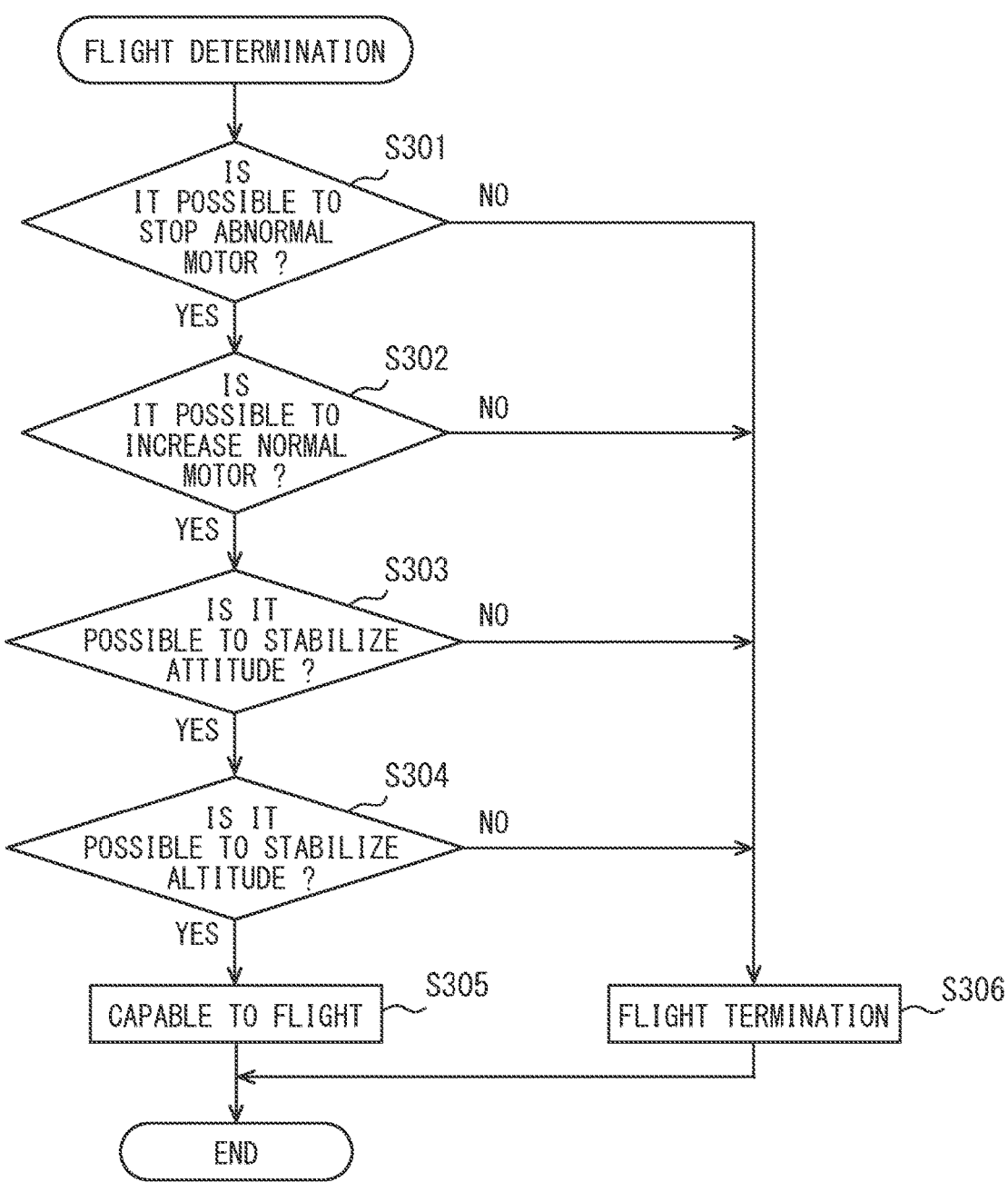
FIG. 5 is a flowchart showing a procedure of flight determination processing.

In step S301 shown in FIG. 5, the flight control device 40 determines whether it is possible to stop driving an abnormal EPU. The abnormal EPU is an EPU 50 among the plurality of EPUs 50 in which an abnormality such as a motor abnormality has occurred. The abnormal EPU corresponds to an abnormal device. Depending on the mode of the abnormality that has occurred in the abnormal EPU, it may be impossible to stop driving the motor device 80 and the like.

In step S302, the flight control device 40 determines whether it is possible to increase the output of the normal EPU. In this determination, it is determined whether the current output of the normal EPU is the maximum output. Then, when the output of the normal EPU is not the maximum output, it is determined that it is possible to increase the output of the normal EPU. The normal EPU is an EPU 50 among the plurality of EPUs 50 in which an abnormality such as a motor abnormality has not occurred. Among the plurality of EPUs 50, an EPU 50 different from the abnormal EPU is a normal EPU. The normal EPU corresponds to a normal device.

In step S303, the flight control device 40 determines whether it is possible to stabilize the attitude of the eVTOL 10. In this determination, it is determined whether the attitude of the eVTOL 10 can be stabilized by the attitude adjustment device provided in the eVTOL 10. As the attitude adjustment device, there are ailerons and the like. The flight control device 40 determines whether the attitude adjustment device operates normally, and determines that the attitude of the eVTOL 10 can be stabilized when the attitude adjustment device operates normally.

In step S304, the flight control device 40 determines whether the altitude of the eVTOL 10 can be stabilized. In this determination, it is determined whether the altitude of the eVTOL 10 can be stabilized by the altitude adjustment device provided in the eVTOL 10. The altitude adjustment device includes a flap and the like. The flight control device 40 determines whether the altitude adjustment device operates normally, and determines that the altitude of the eVTOL 10 can be stabilized when the altitude adjustment device operates normally.

In the flight determination processing, when all of the following are possible: stopping the drive of the abnormal EPU, increasing the output of the normal EPU, stabilizing the attitude of the eVTOL 10, and stabilizing the altitude of the eVTOL 10, the flight control device 40 proceeds to step S305. In step S305, the flight control device 40 determines that the eVTOL 10 is capable of flight even if an abnormality has occurred in the eVTOL 10, and performs a flight enable processing. In this flight enable processing, information indicating that the eVTOL 10 is capable of flight is stored in the storage device 35 or the like. For example, the flight control device 40 sets a flight capable flag indicating that the eVTOL 10 is capable of flight in the storage device 35 or the like. In step S306, when the eVTOL 10 can maintain the flight state for a predetermined period of time, it is determined that the eVTOL 10 is capable of flight. This predetermined time is, for example, several seconds to several tens of seconds.

In the flight determination processing, when any one of the following is not possible: stopping the drive of the abnormal EPU, increasing the output of the normal EPU, stabilizing the attitude of the eVTOL 10, and stabilizing the altitude of the eVTOL 10, the flight control device 40 proceeds to step S306. In step S306, the flight control device 40 determines that the eVTOL 10 is not capable of flight, and performs the flight termination processing. In this flight termination processing, the information indicating that the flight of the eVTOL 10 is to be terminated is stored in the storage device 35 or the like.

Returning to FIG. 3, after the flight determination processing, the flight control device 40 proceeds to step S104. The flight control device 40 determines whether the eVTOL 10 is capable of flight in step S104. In this determination, for example, it is determined whether the flight capable flag is set. Then, when the flight capable flag is set, it is determined that the eVTOL 10 is capable of flight.

When the eVTOL 10 is not capable of flight, the flight control device 40 proceeds to step S113. The flight control device 40 performs an emergency landing processing in step S113. In the emergency landing processing, the EPU control is automatically performed to vertically land the eVTOL 10 at an emergency landing site vertically below from the current speed and altitude. The emergency landing processing is a processing for landing the eVTOL 10 in at least one of the shortest distance and minimum time. The EPU control may be switched from automatic to manual by the pilot during an emergency landing of the eVTOL 10. For example, when the operation sensor 38*a* detects that a switching operation has been performed on the operation portion 38, the EPU control may be switched to manual mode.

When the eVTOL 10 is capable of flight, the flight control device 40 proceeds to step S105. In step S105, the flight control device 40 determines whether the eVTOL 10 is taking off vertically. In this determination, it is determined whether the flight phase of the eVTOL 10 is the takeoff phase. In this determination, when the current flight phase is the takeoff phase, it is determined that the eVTOL 10 is taking off vertically. The takeoff phase is a phase for vertical takeoff of the eVTOL 10 in which no abnormality has occurred. The flight control device 40 determines whether the current flight phase is the takeoff phase, depending on the altitude, speed, aircraft configuration, etc. of the eVTOL 10.

In the eVTOL 10, the vertical takeoff may be started when the flight phase is changed to the takeoff phase. In this case, the eVTOL 10 is in a flight state according to the flight phase. In this case, the flight phase may also be referred to as a flight mode.

When the eVTOL 10 is taking off vertically, the flight control device 40 proceeds to step S106. When the flight phase is changed to the takeoff phase, for example, a timing at which at least a portion of the eVTOL 10 floats off the takeoff surface is the timing at which vertical takeoff of the eVTOL 10 is started. The eVTOL 10 is in a state separated from the takeoff surface during vertical takeoff. The takeoff surface is the ground, etc. on which the eVTOL 10 was in contact with just before taking off.

The flight control device 40 performs a takeoff processing in step S106. In the takeoff processing, processing is performed to land the eVTOL 10 in which an abnormality has occurred during vertical takeoff. The takeoff processing will be explained with reference to the flowchart in FIG. 6.

Figure 6:
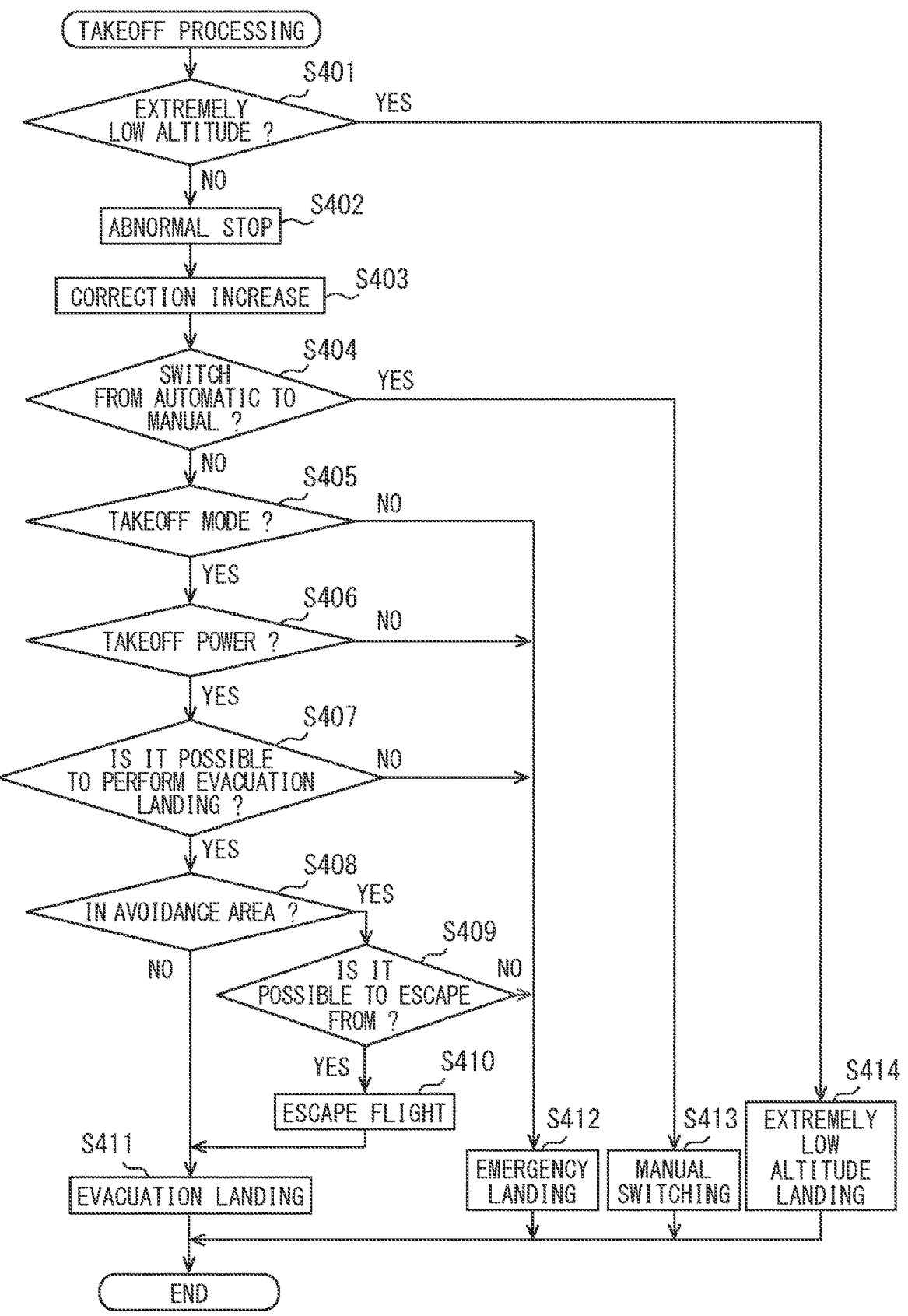
FIG. 6 is a flowchart showing a procedure for processing during takeoff.

In step S401 shown in FIG. 6, the flight control device 40 determines whether the eVTOL 10 is at an extremely low altitude. The extremely low altitude is an altitude where the distance between the eVTOL 10 and the takeoff surface is, for example, several centimeters to several meters. Examples of the case where the eVTOL 10 is at an extremely low altitude include a case where an abnormality occurs immediately after the eVTOL 10 starts vertical takeoff.

When the eVTOL 10 is at the extremely low altitude, the flight control device 40 proceeds to step S414. The flight control device 40 performs an extremely low altitude landing processing in step S414. In the extremely low altitude landing processing, EPU control is automatically performed in order to vertically land the eVTOL 10 vertically downward from the extremely low altitude. The EPU control may be switched from automatic to manual while the eVTOL 10 is landing at the extremely low altitude.

When the eVTOL 10 is not at the extremely low altitude, the flight control device 40 performs a stabilization processing in steps S402 and S403. In this stabilization processing, a processing is performed to stabilize both the attitude and altitude of the eVTOL 10 in which the abnormality has occurred during vertical takeoff.

The flight control device 40 performs an abnormal stop processing in step S402 of the stabilization processing. In the abnormal stop processing, the driving of the abnormal EPU is stopped. In the eVTOL 10, the drive rotation of the rotor 20 that was being driven and rotated due to the abnormal EPU stops. Therefore, the overall output of the eVTOL 10 decreases by the amount that the abnormal EPU stops driving. The overall output is the output from all EPUs 50 driving in the eVTOL 10. For example, the total output is the sum of the outputs of all the EPUs 50 being driven in the eVTOL 10. The output of the EPU 50 is, for example, the output of the motor device 80 included in the EPU 50. In the eVTOL 10, thrust is generated according to the overall output. A function of executing the processing of step S402 in the flight control device 40 corresponds to an abnormality stop portion.

The flight control device 40 performs a correction increase processing in step S403. In this correction increase processing, the output of at least one normal EPU is increased to compensate for the decrease in the overall output of the eVTOL 10 when the abnormal EPU is stopped. In addition, in the correction increase processing, which normal EPU's output is to be increased relative to the abnormal EPU is set in order to correct the change in the attitude of the eVTOL 10 that occurs due to the abnormal EPU. The function of executing the processing of step S403 in the flight control device 40 corresponds to the correction increase portion.

In the correction increase processing of the present embodiment, the output of an adjacent EPU among a plurality of normal EPUs is increased. The adjacent EPU is a normal EPU adjacent to the abnormal EPU among the plurality of normal EPUs. For the normal EPU, the output is increased by increasing the motor rotation speed, for example. When the output of the normal EPU increases, the rotational speed of the rotor 20 driven and rotated by the normal EPU increases, and the thrust generated by the rotor 20 increases.

For example, in FIG. 1, it is assumed that among the plurality of EPUs 50, the EPU 50A is an abnormal EPU, and the other EPUs 50B1 to 50B5 are all normal EPUs. In this case, the flight control device 40 stops driving the EPU 50A, which is the abnormal EPU. Further, the flight control device 40 increases the output of the EPUs 50B1 and 50B2, which are adjacent EPUs. Among the plurality of normal EPUs, the EPUs 50B1 and 50B2 are located on both sides of the EPU 50A in the circumferential direction of the yaw axis AZ. In the eVTOL 10, among the EPUs 50B1 to 50B5, the EPUs 50B1 and 50B2 located closest to the EPU 50A are considered adjacent EPUs.

For example, it is assumed that the EPU 50 provided for the right main wing in the eVTOL 10 is EPU 50A. Further, it is assumed that the EPU 50 in front of the right main wing is EPU 50B1, and the EPU 50 behind the right main wing is EPU 50B2. The EPU 50A corresponds to the abnormal device, and the EPUs 50B1 to 50B5 correspond to the normal devices. Further, the EPUs 50B1 and 50B2 correspond to the latest devices and the adjacent devices.

For example, unlike the present embodiment, a configuration is assumed in which the drive of EPU 50A, which is an abnormal EPU, is stopped, but the outputs of EPUs 50B1 to 50B5 are not increased. In this configuration, among the pair of EPUs 50A and 50B3 arranged along the pitch axis AY in the eVTOL 10, when the EPU 50A stops driving, the output balance in the roll direction is disrupted. In this case, in the eVTOL 10, while the output on the EPU 50A side decreases, the output on the EPU 50B3 side does not decrease. Therefore, the eVTOL 10 tends to tilt in the roll direction so that the wing 13 on which the EPU 50A is located is lowered.

On the other hand, in the present embodiment, the output of the EPU 50B1 and 50B2, which are adjacent EPUs, is increased, so that the output of the EPU 50A in the eVTOL 10 is increased. That is, the decreased output due to stopping the drive of the EPU 50A is compensated for by the increased output of the EPUs 50B1 and 50B2. Therefore, it is difficult for the eVTOL 10 to tilt in the roll direction. In the present embodiment, it is not necessarily necessary to increase or decrease the outputs of the EPUs 50B3 to 50B5, but they may be increased or decreased for output balance.

In the correction increase processing, the output of at least one normal EPU is increased so that the entire output of the eVTOL 10 is within an allowable range. Regarding a lower limit of the allowable range, in the correction increase processing, the output of at least one normal EPU is increased so that the degree of decrease in the overall output of the eVTOL 10 due to stopping the drive of the abnormal EPU is kept at the lower limit percentage. For example, in the correction increase processing, when the overall output of the eVTOL 10 decreases, the output of the normal EPU is increased so that the percentage of the overall output to the reference output becomes equal to or higher than a lower limit percentage. The lower limit percentage is a predetermined percentage, for example, a value of 90% or more, preferably a value of 95% or more. Examples of the reference output include the overall output when the normal eVTOL 10 flies, the rated output for the overall output of the eVTOL 10, and the like.

For example, it is assumed that the eVTOL 10 is equipped with six EPUs 50. In this eVTOL 10, six rotors 20 are provided in a one-to-one ratio for six EPUs 50. In one EPU 50, the rated output of the motor device 80 is 10 kW, and the maximum output of the motor device 80 is 12 kW. When the eVTOL 10 performs a normal takeoff with no abnormality occurring, the flight control device 40 drives the motor device 80 in each of the six EPUs 50 at a rated output of 10 kW. In this case, the overall output of the eVTOL 10 is 60 kW.

On the other hand, when the eVTOL 10 performs an abnormal takeoff with one abnormal EPU stopped, the flight control device 40 increases the outputs of the remaining five EPUs 50 in the correction increase processing. For example, the flight control device 40 increases the output of the motor device 80 in each of two adjacent EPUs among the five normal EPUs to 12 kW, and increases the output of motor device 80 to 11 kW in each of the remaining three normal EPUs. In this case, the overall output of the eVTOL 10 is 57 kW. When the overall output during the normal takeoff is the reference output, then in the eVTOL 10, the ratio of the overall output during the abnormal takeoff to the reference output is 95%, and therefore, more than 90% is realized.

Regarding an upper limit of the allowable range, in the correction increase processing, the output of the normal EPU is increased so that the ratio of the overall output to the reference output in the eVTOL 10 does not reach the upper limit percentage. The upper limit percentage is a predetermined percentage, and is, for example, 100%. This prevents the EPU 50, such as the motor device 80, from having excessive specifications. For example, regarding the specs of the motor device 80, the maximum output is prevented from being set to significantly exceed the rated output. This makes it easier to reduce the weight of the EPU 50, such as the motor device 80.

Returning to FIG. 6, the flight control device 40 determines whether to switch the EPU control from automatic to manual in step S404. In this determination, it is determined whether a switching operation has been performed on the operation portion 38 using the detection signal of the operation sensor 38a. When the switching operation is performed on the operation portion 38, the flight control device 40 determines to switch the EPU control to manual, and proceeds to step S413. For example, when the pilot determines that the stabilization processing is unnecessary, it is considered that the pilot performs a switching operation on the operation portion 38. The switching operation corresponds to a canceling operation.

The flight control device 40 performs the manual switching processing in step S413. In this manual switching processing, a processing for switching the EPU control to manual operation is performed. For example, in manual switching processing, the stabilization processing is canceled. When the stabilization processing is canceled, the correction increase processing is canceled and the correction increase processing is not performed. In canceling the stabilization processing, the abnormal stop processing may also be canceled. The function of executing the processing of step S413 in the flight control device 40 corresponds to a canceling portion.

When the EPU control is not switched to the manual operation, the flight control device 40 determines whether it is necessary to make an emergency landing of the eVTOL 10 in steps S405, S406, and S407. In step S405, the flight control device 40 determines whether the eVTOL 10's aircraft configuration is in takeoff mode. The eVTOL 10's aircraft configuration can be changed using the EPU 50, attitude adjustment device, and the like. The takeoff mode is a flight configuration in which the eVTOL 10 takes off vertically. When the eVTOL 10 is in the takeoff mode, for example, the attitude adjustment device is in the vertical takeoff mode.

In step S406, the flight control device 40 determines whether the overall output of the eVTOL 10 becomes the takeoff power. The takeoff power is the overall output required for the eVTOL 10 to take off vertically. The takeoff power is set to an allowable range set for the standard power for vertical takeoff. The flight control device 40 determines whether the overall output of the eVTOL 10 is within the allowable range for vertical takeoff. When the overall output of the eVTOL 10 is within the allowable range for vertical takeoff, the flight control device 40 determines that the overall output of the eVTOL 10 becomes the takeoff output.

In step S407, the flight control device 40 determines whether the eVTOL 10 can perform an evacuation landing. In this determination, it is determined whether or not the eVTOL 10 can fly horizontally. The evacuation landing means a vertical landing of the eVTOL 10 at an evacuation point. The evacuation point may be the same location as the takeoff point of the eVTOL 10, or may be a different location. The evacuation point may be set at a location spaced apart in the horizontal direction from the current location of the eVTOL 10. when the eVTOL 10 is movable in the horizontal direction, the flight control device 40 determines that the eVTOL 10 is capable of evacuation landing.

For example, when the eVTOL 10 is a tilt rotor aircraft, the flight control device 40 determines whether or not the tilt angle of the rotor 20 can be changed, and when the tilt angle can be changed, it is determined that the eVTOL 10 can perform an evacuation landing. When the eVTOL 10 is equipped with a cruise rotor 20, the flight control device 40 determines whether or not the cruise rotor 20 is capable of drive rotation, and when the cruise rotor 20 is capable of the drive rotation, It is determined that the eVTOL 10 is capable of the evacuation landing.

In the eVTOL 10, when any of the following conditions is not satisfied: the flight mode is the takeoff mode, the overall output is the takeoff power, and the evacuation landing is possible, the flight control device 40 determines that it is necessary to make an emergency landing of the eVTOL 10. In this case, the flight control device 40 proceeds to step S412 and performs the emergency landing processing. In this emergency landing processing, the processing is performed to vertically land at an emergency landing location vertically below. This emergency landing processing is performed in the same manner as the emergency landing processing in step S113, for example. The function of the flight control device 40 executing the processing of step S412 corresponds to an abnormal-landing unit.

In the eVTOL 10, when all of the following conditions are satisfied: the flight mode is the takeoff mode, the overall output is the takeoff power, and the evacuation landing is possible, the flight control device 40 determines that it is not necessary to make an emergency landing of the eVTOL 10. In this case, the flight control device 40 proceeds to step S408.

In step S408, the flight control device 40 determines whether the flight state of the eVTOL 10 is in an avoidance area. Regarding the eVTOL 10, there is the avoidance area that should be avoided during vertical takeoff and landing. The avoidance area is an area where safety is likely to deteriorate when a problem such as an abnormality occurs during vertical takeoff and landing. The avoidance area is, for example, an area in which an autorotation of the eVTOL 10 is difficult. Further, the avoidance area is an area set based on the speed and altitude of the eVTOL 10. This speed is the flight speed of the eVTOL 10 in the direction in which the eVTOL 10 moves. In the eVTOL 10, the flight state changes, for example, by changing at least one of speed and altitude. Further, in the eVTOL 10, the speed and altitude can be changed by EPU control. In this way, the flight state is a state that changes particularly in accordance with EPU control among the states related to flight of the eVTOL 10. The flight state of the eVTOL 10 corresponds to the flight mode, and the avoidance area corresponds to the avoidance mode.

Figure 7:
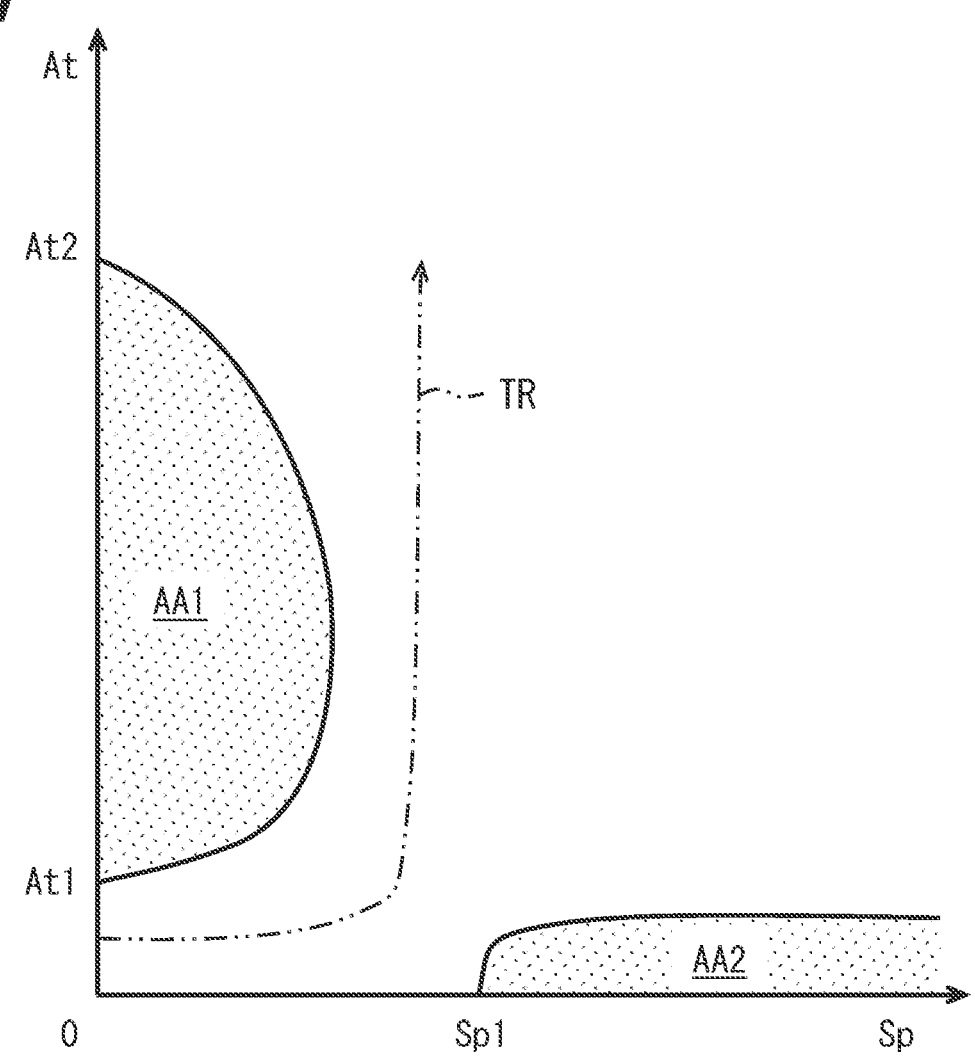
FIG. 7 is a diagram for explaining an avoidance area.

For example, as shown in FIG. 7, in a graph in which one of the two axes is altitude and the other is speed, there are two avoidance areas, a first avoidance area AA1 and a second avoidance area AA2. In FIG. 7, the speed is defined as Sp and the altitude is defined as At. When the flight state of the eVTOL 10 is included in the first avoidance area AA1 or the second avoidance area AA2, the flight state of the eVTOL 10 is positioned in the avoidance area. FIG. 7 is an encircling diagram showing the avoidance area with an enclosing line in terms of speed and altitude. Further, FIG. 7 is not a diagram showing the physical position of the eVTOL 10, but a diagram showing the flight state of the eVTOL 10.

The first avoidance area AA1 is an area where the eVTOL 10 has an intermediate altitude among areas where the velocity is small to some extent and includes zero. In a state where the speed of the eVTOL 10 is low to some extent, the safety of the eVTOL 10 tends to be sufficiently high both when the eVTOL 10 performs a vertical landing from a sufficiently low altitude and when the eVTOL 10 performs a vertical landing from a sufficiently high altitude. For example, when the eVTOL 10 starts a vertical landing from an extremely low altitude with zero speed, even if the overall output of the eVTOL 10 is insufficient, the impact when the eVTOL 10 makes a vertical landing can be suppressed to a small level. When the eVTOL 10 starts a vertical landing from a sufficiently high altitude, the time required for the eVTOL 10 to land is relatively long, making it easy to secure time for taking necessary measures for a safe landing. As described above, for example, even if the eVTOL 10 starts a vertical landing from either a lower altitude or a higher altitude than the first avoidance area AA1 when the speed is zero, there is no lack of safety during the vertical landing.

On the other hand, when the eVTOL 10 performs a vertical landing from an intermediate altitude, it is likely that the impact will be large when the eVTOL 10 performs a vertical landing, and that there will be insufficient time to take action until the eVTOL 10 lands. For example, when the eVTOL 10 starts the vertical landing from an altitude positioned in the first avoidance area AA1 when the speed is zero, the safety during the vertical landing is likely to be insufficient. For example, when the eVTOL 10 starts the vertical landing from a higher altitude than the first avoidance area AA1 at zero speed, it is possible to avoid the first avoidance area AA1 by changing at least one of the speed and altitude of the eVTOL 10, and it is unlikely to cause a decrease in safety.

In the first avoidance area AA1, an altitude upper limit value At2 is set to a height between, for example, several tens of meters to a hundred and several tens of meters. The altitude upper limit value At2 is the upper limit value of the area where the speed is zero in the first avoidance area AA1. In the first avoidance area AA1, an altitude lower limit value At1 is set to an altitude of, for example, several tens of cm to several meters. The altitude lower limit value At1 is the lower limit value of the area where the speed is zero in the first avoidance area AA1. The altitude lower limit value At1 is set to an altitude higher than extremely low altitude.

The second avoidance area AA2 is an area where the speed of the eVTOL 10 is too high among areas where the altitude is small to some extent and includes zero. When the altitude of the eVTOL 10 is low to a certain extent and the speed of the eVTOL 10 is too high, safety is likely to be insufficient when the eVTOL 10 performs the vertical landing. For example, even if the eVTOL 10 is at an extremely low altitude, when the speed of the eVTOL 10 is high enough to be included in the second avoidance area AA2, the safety during the vertical landing is likely to deteriorate due to the loss of balance when the eVTOL 10 lands. Even if the eVTOL 10 starts the vertical landing from an altitude higher than the second avoidance area AA2, when the flight state of the eVTOL 10 enters the second avoidance area AA2 before the landing of the eVTOL 10 is completed, the safety during the vertical landing is likely to deteriorate.

The lower speed limit Sp1 of the second avoidance area AA2 is set, for example, to a speed from several km/h to less than ten km/h. The speed lower limit value Sp1 is set to a value larger than the speed upper limit value of the first avoidance area AA1, for example. Further, the altitude upper limit At2 of the second avoidance area AA2 is set to a lower altitude than the altitude lower limit At1 of the first avoidance area AA1.

As described later, when the eVTOL 10 is positioned in the first avoidance area AA1 or the second avoidance area AA2, the flight control device 40 may cancel the vertical landing. The first avoidance area AA1 and the second avoidance area AA2 are sometimes referred to as landing cancel areas. Further, a boundary between these avoidance areas AA1, AA2 and other areas includes critical decision points.

Returning to FIG. 6, when the flight state of the eVTOL 10 is not in the avoidance area, the flight control device 40 proceeds to step S411. For example, when an abnormality occurs in the eVTOL 10 while the eVTOL 10 is taking off vertically on a takeoff route TR shown in FIG. 7, the flight control device 40 determines that the flight state of the eVTOL 10 is not in either the first avoidance area AA1 or the second avoidance area AA2.

The flight control device 40 performs an evacuation landing processing in step S411. In the evacuation landing processing, processing for causing the eVTOL 10 to make an evacuation landing is performed. In the evacuation landing processing, the vertical landing of the eVTOL 10 is performed so that the eVTOL 10 does not enter either the first avoidance area AA1 or the second avoidance area AA2. The evacuation landing processing includes a preparation processing for the evacuation landing of the eVTOL 10. The preparation processing includes a processing of driving an attitude adjustment device, an altitude adjustment device, and the like. The function of the flight control device 40 executing the processing of step S411 corresponds to an abnormal-landing unit.

When the flight state of the eVTOL 10 is positioned in the avoidance area, the flight control device 40 proceeds to step S409. In step S409, the flight control device 40 determines whether the eVTOL 10 can escape from the avoidance area. In this determination, it is determined whether at least one of the speed and altitude of the eVTOL 10 can be changed so that the flight state of the eVTOL 10 escapes from the avoidance area. When the flight state of the eVTOL 10 is such that at least one of the speed and altitude can be changed so as to escape from the avoidance area, the flight control device 40 determines that it is possible to escape from the avoidance area, and proceeds to step S410.

The flight control device 40 performs an escape flight processing in step S410. The escape flight processing is a processing for causing the eVTOL 10 to escape from the avoidance area. In this processing, a processing is performed to change at least one of the speed and altitude of the eVTOL 10 so that the flight state of the eVTOL 10 escapes from the avoidance area. The escape flight is a flight for causing the flight state of the eVTOL 10 to escape from the avoidance area. For example, when the flight state of the eVTOL 10 is positioned in the first avoidance area AA1, the flight control device 40 changes at least one of the speed and altitude of the eVTOL 10 so that the flight state escapes from the first avoidance area AA1. The function of executing the processing of step S410 in the flight control device 40 corresponds to an escape execution portion.

After the flight state of the eVTOL 10 escapes from the avoidance area, the flight control device 40 performs the evacuation landing processing in step S411. A function of executing the processing of step S411 in the flight control device 40 corresponds to the abnormal landing portion and the escape landing portion. When it is not possible for the eVTOL 10 to escape from the avoidance area, the flight control device 40 proceeds to step S412 and performs the emergency landing processing.

Figure 8:
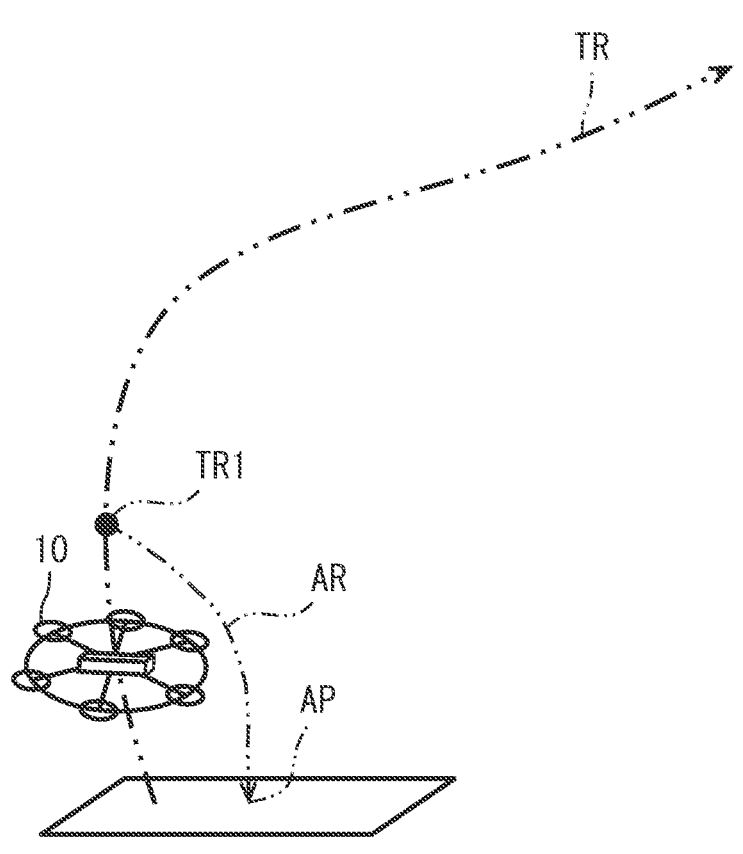
FIG. 8 is a diagram showing an avoidance route during vertical takeoff of the eVTOL.

As shown in FIG. 8, it is assumed that an EPU abnormality occurs at the timing when the eVTOL 10 during the vertical takeoff reaches a predetermined position TR1 on the takeoff route TR, and due to the occurrence of the EPU abnormality, the flight state enters the first avoidance area AA1. In this case, the eVTOL 10 lands at the evacuation point AP on the escape route AR. The escape route AR includes a route in which the flight state of the eVTOL 10 escapes from the first avoidance area AA1 due to the escape flight processing. Further, the escape route AR includes a route where the eVTOL 10 escapes and lands at the escape point AP through the escape landing processing after the flight state of the eVTOL 10 escapes from the first avoidance area AA1. The escape route AR is a route for the eVTOL 10 to escape from the first avoidance area AA1 and reach the evacuation point AP without entering the second avoidance area AA2. The predetermined position TR1 is sometimes referred to as a critical decision point.

Returning to FIG. 3, in step S105, when the eVTOL 10 is not taking off vertically, the flight control device 40 proceeds to step S107. In step S107, the flight control device 40 determines whether the eVTOL 10 is landing vertically. In this determination, it is determined whether the flight phase of the eVTOL 10 is the landing phase. In this determination, when the current flight phase is the landing phase, it is determined that the eVTOL 10 is landing vertically. The landing phase is a phase for vertically landing the eVTOL 10 in which no abnormality has occurred. The flight control device 40 determines whether the current flight phase is the landing phase, depending on the altitude, speed, aircraft configuration, etc. of the eVTOL 10.

When the eVTOL 10 is landing vertically, the flight control device 40 proceeds to step S108. The flight control device 40 performs a landing processing in step S108. In the landing processing, a processing is performed to land the eVTOL 10 in which an abnormality has occurred during vertical landing. The landing processing will be explained with reference to the flowchart of FIG. 9.

Figure 9:
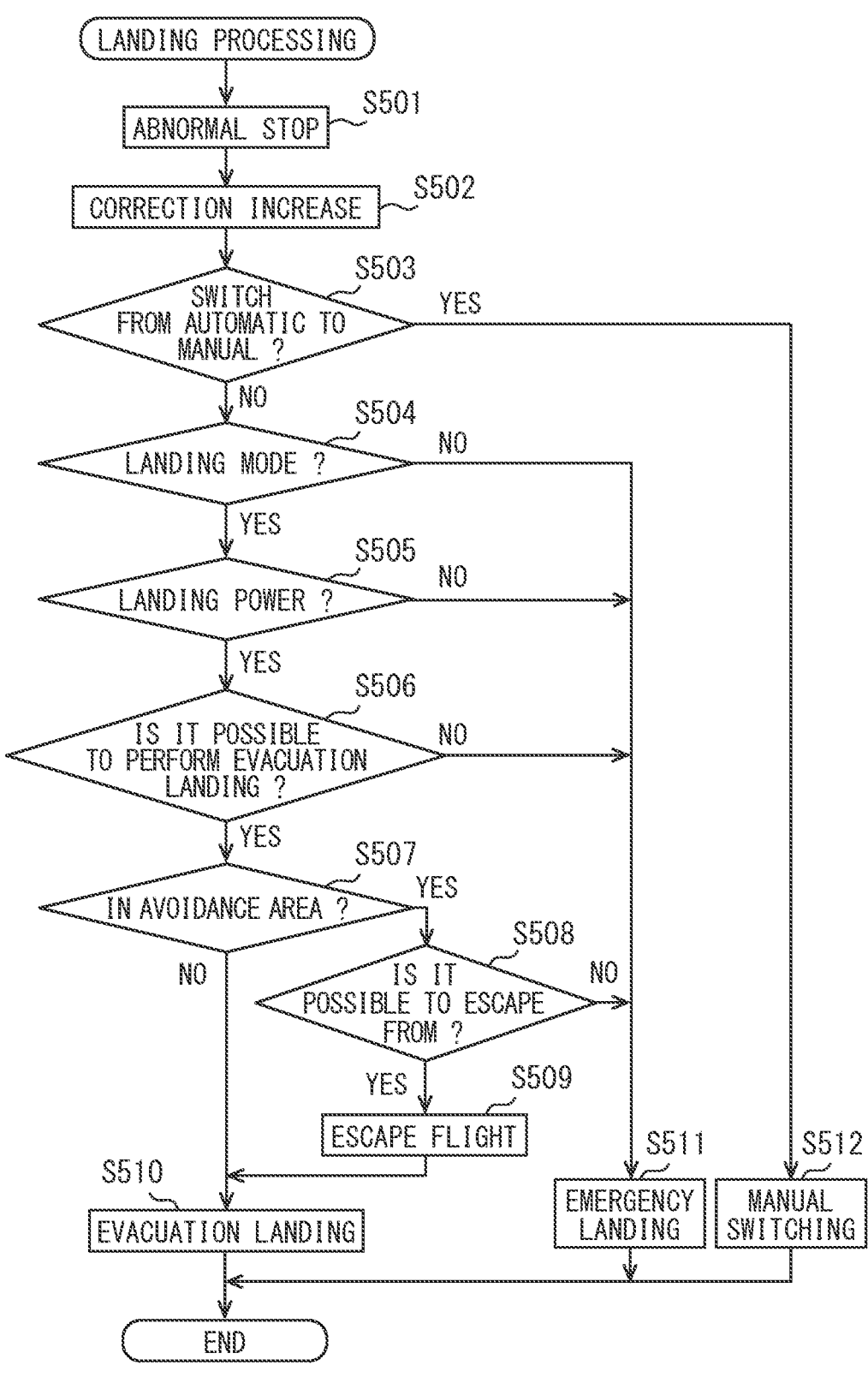
FIG. 9 is a flowchart showing a procedure of processing during landing.

The flight control device 40 performs a stabilization processing in steps S501 and S502 shown in FIG. 9. In this stabilization processing, a processing is performed to stabilize both the attitude and altitude of the eVTOL 10 in which an abnormality has occurred during vertical landing. The flight control device 40 performs an abnormal stop processing in step S501 of the stabilization processing. This step S501 is performed in the same manner as step S402. The flight control device 40 performs a correction increase processing in step S502. This step S502 is performed in the same manner as step S403. The function of executing the processing of step S501 in the flight control device 40 corresponds to an abnormality stop portion, and the function of executing the processing of step S502 corresponds to a correction increase portion.

In step S503, the flight control device 40 determines whether to switch EPU control from automatic to manual. This determination is performed in the same manner as the determination in step S404. When switching the EPU control to manual, the flight control device 40 proceeds to step S512 and performs a manual switching processing. This step S512 is performed in the same manner as step S413. The function of executing the processing of step S512 in the flight control device 40 corresponds to a canceling portion.

When the EPU control is not switched to manual, the flight control device 40 proceeds to step S504. The flight control device 40 determines whether it is necessary to make an emergency landing of the eVTOL 10 in steps S504, S505, and S506. In step S504, the flight control device 40 determines whether the flight mode of the eVTOL 10 becomes the landing mode. The landing mode is a flight configuration in which the eVTOL 10 makes a vertical landing. When the eVTOL 10 is in the landing mode, for example, the attitude adjustment device is in the vertical landing mode.

In step S505, the flight control device 40 determines whether the overall output of the eVTOL 10 becomes the landing power. The landing power is the overall output required for the eVTOL 10 to land vertically. The landing power is an allowable range set with respect to the standard power for vertical landing. The flight control device 40 determines whether the overall output of the eVTOL 10 is within the allowable range for vertical landing. When the overall output of the eVTOL 10 is within the allowable range for vertical landing, the flight control device 40 determines that the overall output of the eVTOL 10 becomes the landing output.

In step S506, the flight control device 40 determines whether the eVTOL 10 can perform an evacuation landing. This step S506 is performed in the same manner as step S407.

In the eVTOL 10, when any of the following conditions is not satisfied: the flight mode is the landing mode, the overall output is the landing power, and the evacuation landing is possible, the flight control device 40 determines that it is necessary to make an emergency landing of the eVTOL 10. In this case, the flight control device 40 proceeds to step S511 and performs the emergency landing processing. This step S511 is performed in the same manner as step S412.

In the eVTOL 10, when all of the following conditions are satisfied: the flight mode is the landing mode, the overall output is the landing power, and the evacuation landing is possible, the flight control device 40 determines that it is not necessary to make an emergency landing of the eVTOL 10. In this case, the flight control device 40 proceeds to step S507.

In step S507, the flight control device 40 determines whether the flight state of the eVTOL 10 is positioned in the avoidance area. This step S507 is performed in the same manner as step S408. When the flight state of the eVTOL 10 is not positioned in the avoidance area, the flight control device 40 proceeds to step S510 and performs the evacuation landing processing similarly to step S411. When the flight state of the eVTOL 10 is positioned in the avoidance area, the flight control device 40 proceeds to step S508 and performs the escape determination as in step S409. When the flight state of the eVTOL 10 is such that it is possible to escape from the avoidance area, the flight control device 40 proceeds to step S509 and performs the escape flight processing in the same manner as step S410. The function of executing the processing of step S509 in the flight control device 40 corresponds to the escape execution portion.

After the flight state of the eVTOL 10 escapes from the avoidance area, the flight control device 40 performs the evacuation landing processing in step S510. A function of executing the processing of step S510 in the flight control device 40 corresponds to the abnormal landing portion and the escape landing portion. When the flight state of the eVTOL 10 is such that it is not possible to escape from the avoidance area, the flight control device 40 proceeds to step S511 and performs the emergency landing processing.

Returning to FIG. 3, in step S107, when the eVTOL 10 is not landing vertically, the flight control device 40 proceeds to step S109. The flight control device 40 determines whether the eVTOL 10 is cruising in step S109. In this determination, it is determined whether the flight phase of the eVTOL 10 is the cruise phase. In this determination, when the current flight phase is the cruise phase, it is determined that the eVTOL 10 is cruising. The cruise phase is a phase for cruising the eVTOL 10 in which no abnormality has occurred. The flight control device 40 determines whether the current flight phase is the cruise phase, depending on the altitude, speed, aircraft configuration, etc. of the eVTOL 10.

When the eVTOL 10 is cruising, the flight control device 40 proceeds to step S110. The flight control device 40 performs the cruise processing in step S110. In the cruise processing, a processing is performed to land the eVTOL 10 in which an abnormality has occurred during cruise. The cruise processing will be explained with reference to the flowchart in FIG. 10.

Figure 10:
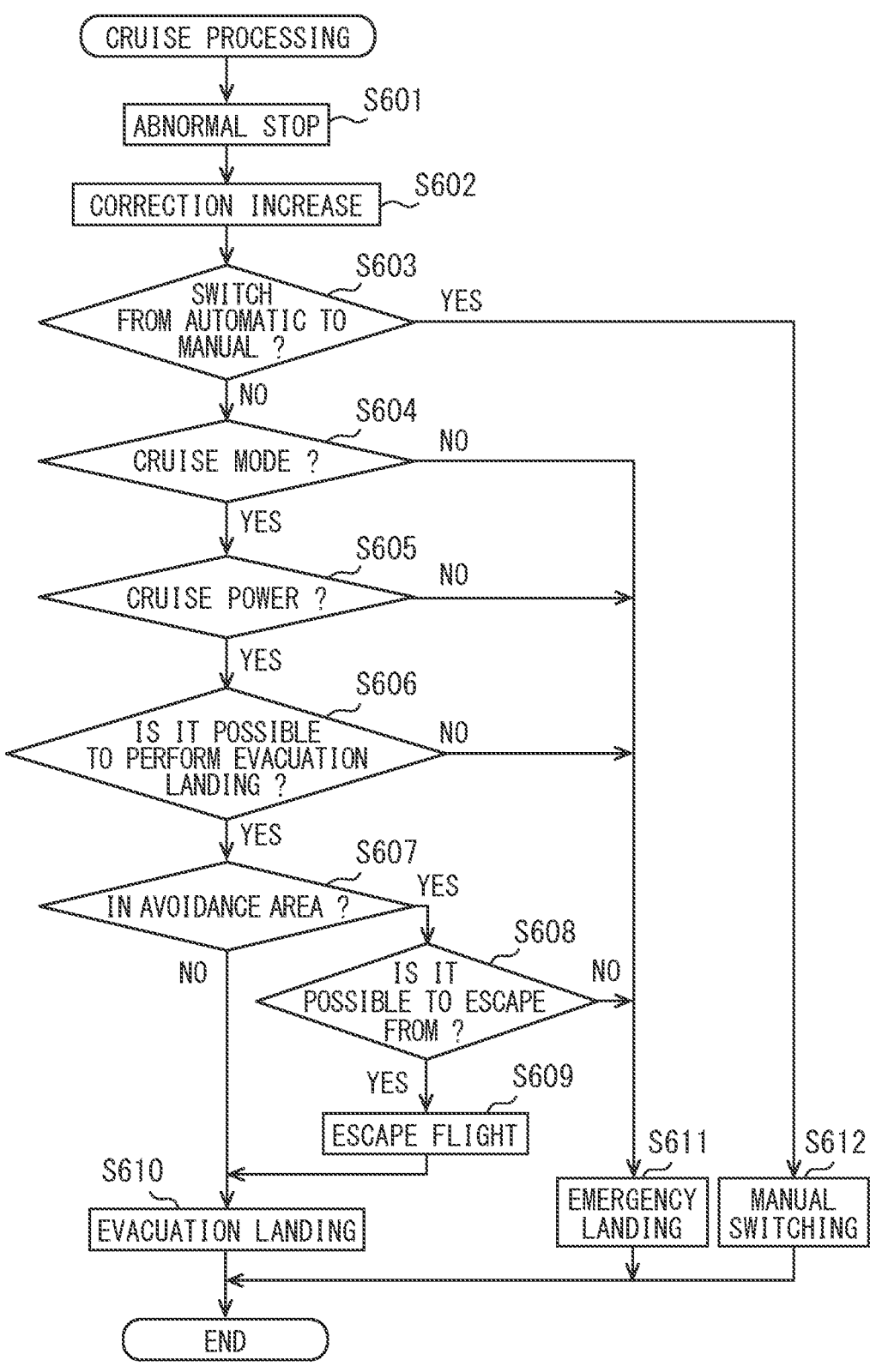
FIG. 10 is a flowchart showing a procedure of processing during cruise.

The flight control device 40 performs a stabilization processing in steps S601 and S602 shown in FIG. 10. In this stabilization processing, a processing is performed to stabilize both the attitude and altitude of the eVTOL 10 in which an abnormality has occurred during cruise. The flight control device 40 performs an abnormal stop processing in step S601 of the stabilization processing. This abnormal stop processing is performed in the same way as the abnormal stop processing in step S402. The flight control device 40 performs a correction increase processing in step S602. This step S602 is performed in the same manner as step S403. The function of executing the processing of step S601 in the flight control device 40 corresponds to an abnormality stop portion, and the function of executing the processing of step S602 corresponds to a correction increase portion.

In step S603, the flight control device 40 determines whether to switch EPU control from automatic to manual. This step S603 is performed in the same manner as step S404. When switching the EPU control to manual, the flight control device 40 proceeds to step S612 and performs a manual switching processing. This step S612 is performed in the same manner as step S413. The function of executing the processing of step S612 in the flight control device 40 corresponds to a canceling portion.

When the EPU control is not switched to manual, the flight control device 40 proceeds to step S604. The flight control device 40 determines whether it is necessary to make an emergency landing of the eVTOL 10 in steps S604, S605, and S606. In step S604, the flight control device 40 determines whether the flight mode of the eVTOL 10 becomes the cruse mode. The cruise mode is a flight mode for the eVTOL 10 to cruise. When the eVTOL 10 is in the cruise mode, for example, the attitude adjustment device is in the cruise mode.

In step S605, the flight control device 40 determines whether the overall output of the eVTOL 10 becomes the cruise power. The cruise power is the overall output required for the eVTOL 10 to cruise. The cruise power has an allowable range set with respect to the cruise reference power. The flight control device 40 determines whether the overall output of the eVTOL 10 is within the allowable range for cruise. When the overall output is within the allowable range for cruise, the flight control device 40 determines that the overall output of the eVTOL 10 becomes the cruise power.

In step S606, the flight control device 40 determines whether the eVTOL 10 can perform an evacuation landing. This step S606 is performed in the same manner as step S407.

In the eVTOL 10, when any of the following conditions is not satisfied: the flight mode is the cruse mode, the overall output is the cruse power, and the evacuation landing is possible, the flight control device 40 determines that it is necessary to make an emergency landing of the eVTOL 10. In this case, the flight control device 40 proceeds to step S611 and performs the emergency landing processing. This step S611 is performed in the same manner as step S412.

In the eVTOL 10, when all of the following conditions are satisfied: the flight mode is the cruse mode, the overall output is the cruse power, and the evacuation landing is possible, the flight control device 40 determines that it is not necessary to make an emergency landing of the eVTOL 10. In this case, the flight control device 40 proceeds to step S607.

In step S607, the flight control device 40 determines whether the flight state of the eVTOL 10 is positioned in the avoidance area. This step S607 is performed in the same manner as step S408. When the flight state of the eVTOL 10 is not positioned in the avoidance area, the flight control device 40 proceeds to step S610 and performs the evacuation landing processing similarly to step S411. When the flight state of the eVTOL 10 is positioned in the avoidance area, the flight control device 40 proceeds to step S608 and performs the escape determination as in step S409. When the flight state of the eVTOL 10 is such that it is possible to escape from the avoidance area, the flight control device 40 proceeds to step S609 and performs the escape flight processing in the same manner as step S410. The function of executing the processing of step S609 in the flight control device 40 corresponds to the escape execution portion.

After the flight state of the eVTOL 10 escapes from the avoidance area, the flight control device 40 performs the evacuation landing processing in step S610. A function of executing the processing of step S610 in the flight control device 40 corresponds to the abnormal landing portion and the escape landing portion. When the flight state of the eVTOL 10 is such that it is not possible to escape from the avoidance area, the flight control device 40 proceeds to step S611 and performs the emergency landing processing.

Returning to FIG. 3, in step S109, when the eVTOL 10 is not cruising, the flight control device 40 proceeds to step S111. The flight control device 40 determines whether the eVTOL 10 is hovering in step S111. In this determination, it is determined whether the flight phase of the eVTOL 10 is a hovering phase. In this determination, when the current flight phase is the hovering phase, it is determined that the eVTOL 10 is hovering. The hovering phase is a phase for hovering the eVTOL 10 in which no abnormality has occurred. The flight control device 40 determines whether the current flight phase is the hovering phase, depending on the altitude, speed, aircraft configuration, etc. of the eVTOL 10.

When the eVTOL 10 is hovering, the flight control device 40 proceeds to step S112. The flight control device 40 performs a hovering processing in step S112. In the hovering processing, a processing is performed to land the eVTOL 10 in which an abnormality has occurred during hovering. The hovering processing will be described with reference to the flowchart in FIG. 11.

Figure 11:
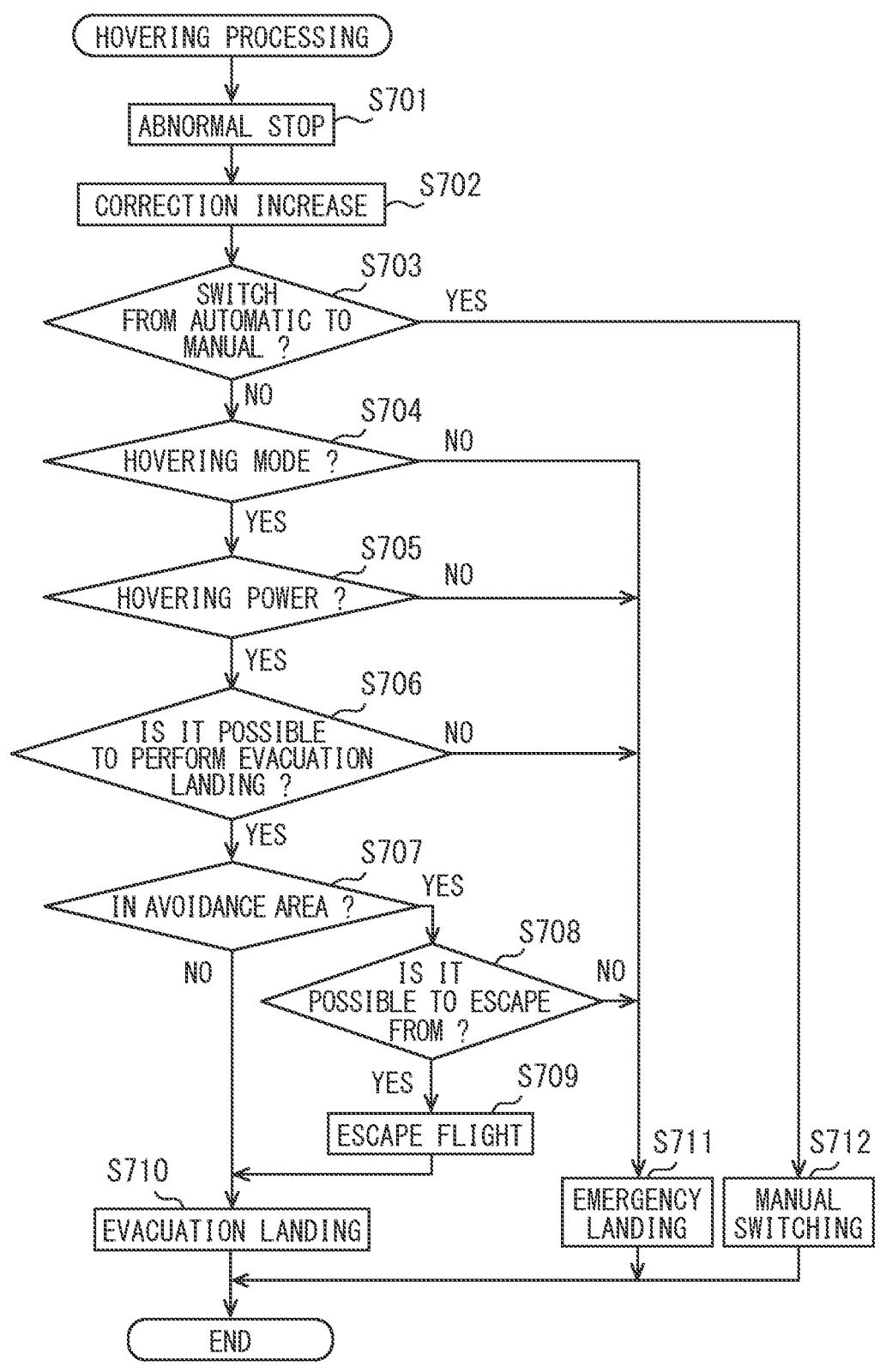
FIG. 11 is a flowchart showing a procedure of processing during hovering.

The flight control device 40 performs a stabilization processing in steps S701 and S702 shown in FIG. 11. In this stabilization processing, a processing is performed to stabilize both the attitude and altitude of the eVTOL 10 in which an abnormality has occurred during hovering. The flight control device 40 performs an abnormal stop processing in step S701 of the stabilization processing. This step S701 is performed in the same manner as step S402. The flight control device 40 performs a correction increase processing in step S702. This step S702 is performed in the same manner as step S403. The function of executing the processing of step S701 in the flight control device 40 corresponds to an abnormality stop portion, and the function of executing the processing of step S702 corresponds to a correction increase portion.

In step S703, the flight control device 40 determines whether to switch EPU control from automatic to manual. This step S703 is performed in the same manner as step S404. When switching the EPU control to manual, the flight control device 40 proceeds to step S712 and performs a manual switching processing. This step S712 is performed in the same manner as step S413. The function of executing the processing of step S712 in the flight control device 40 corresponds to a canceling portion.

When the EPU control is not switched to manual, the flight control device 40 proceeds to step S704. The flight control device 40 determines whether it is necessary to make an emergency landing of the eVTOL 10 in steps S704, S705, and S706. In step S704, the flight control device 40 determines whether the flight mode of the eVTOL 10 becomes the hovering mode. The hovering mode is a flight mode for the eVTOL 10 to hover. When the eVTOL 10 is in the hovering mode, for example, the attitude adjustment device is in the hovering mode.

In step S705, the flight control device 40 determines whether the overall output of the eVTOL 10 becomes the hovering power. The hovering power is the overall output required for the eVTOL 10 to perform hovering. The hovering power has an allowable range set with respect to the reference power for hovering. The flight control device 40 determines whether the overall output of the eVTOL 10 is within the allowable range for hovering. When the overall output of the eVTOL 10 is within the allowable range for hovering, the flight control device 40 determines that the overall output of the eVTOL 10 becomes the hovering power.

In step S706, the flight control device 40 determines whether the eVTOL 10 can perform an evacuation landing. This step S706 is performed in the same manner as step S407.

In the eVTOL 10, when any of the following conditions is not satisfied: the flight mode is the hovering mode, the overall output becomes the hovering power, and the evacuation landing is possible, the flight control device 40 determines that it is necessary to make an emergency landing of the eVTOL 10. In this case, the flight control device 40 proceeds to step S711 and performs the emergency landing processing. This step S711 is performed in the same manner as step S412.

In the eVTOL 10, when all of the following conditions are satisfied: the flight mode is the hovering mode, the overall output becomes the hovering power, and the evacuation landing is possible, the flight control device 40 determines that it is not necessary to make an emergency landing of the eVTOL 10. In this case, the flight control device 40 proceeds to step S707.

In step S707, the flight control device 40 determines whether the flight state of the eVTOL 10 is positioned in the avoidance area. This step S707 is performed in the same manner as step S408. When the flight state of the eVTOL 10 is not positioned in the avoidance area, the flight control device 40 proceeds to step S710 and performs the evacuation landing processing similarly to step S411. When the flight state of the eVTOL 10 is positioned in the avoidance area, the flight control device 40 proceeds to step S708 and performs the escape determination as in step S409. When the flight state of the eVTOL 10 is such that it is possible to escape from the avoidance area, the flight control device 40 proceeds to step S709 and performs the escape flight processing in the same manner as step S410. The function of executing the processing of step S709 in the flight control device 40 corresponds to the escape execution portion.

After the flight situation of the eVTOL 10 escapes from the avoidance area, the flight control device 40 performs the evacuation landing processing in step S710. A function of executing the processing of step S710 in the flight control device 40 corresponds to the abnormal landing portion and the escape landing portion. When the flight state of the eVTOL 10 is such that it is not possible to escape from the avoidance area, the flight control device 40 proceeds to step S711 and performs the emergency landing processing.

The abnormal stop processing and the correction increase processing will be explained together. In the present embodiment, when the EPU abnormality occurs, the abnormal stop processing and the correction increase processing are performed, so the output of the EPU 50 can be automatically controlled without increasing the pilot's workload. Therefore, for the eVTOL 10, it is possible to provide highly safe options for stabilizing the aircraft attitude and suppressing altitude loss, thereby minimizing the risk of accidents during takeoff and landing.

In the eVTOL 10, a plurality of rotor wings generate lift and thrust and control the attitude of the aircraft. In the eVTOL 10, when the abnormality occurs in one of the EPUs 50, it is conceivable that the normal EPU located diagonally opposite to the aircraft without any malfunction is stopped to stabilize the aircraft attitude and make an emergency landing. In FIG. 1, the EPU 50B3 is a normal EPU located diagonally. The eVTOL 10 is also an aircraft that takes off and lands vertically while stabilizing the attitude of the aircraft by balancing the lift forces generated by a plurality of rotor wings.

In addition, in the eVTOL 10, compared to an airplane that obtains lift from fixed wings, the pilot's workload required to control the output of the EPU 50 in order to stabilize the aircraft attitude and maintain the safe altitude becomes higher. Particularly when an abnormality occurs, the complexity of this maneuver increases and can directly affect flight safety, so it is preferable to automate the output control of the plurality of rotor blades. In particular, troubles during takeoff and landing tend to reduce safety, as these are times when the pilot's workload is at its highest.

In the present embodiment, the abnormality stop processing and the correction increase processing are performed when the EPU abnormality occurs during vertical takeoff of the eVTOL 10 and when the EPU abnormality occurs during vertical landing of the eVTOL 10. In the eVTOL 10, the takeoff phase and the landing phase are included in the flight phase in which the pilot has a high workload. There is concern that the risk of aviation accidents increases during the flight phase, where the workload is high. On the other hand, when the abnormality occurs in the EPU 50 in the eVTOL 10, the outputs of the abnormal EPU and the normal EPU are automatically controlled to stabilize the aircraft attitude, thereby making it possible to reduce the risk of accidents including human error.

In the present embodiment, the drive of the abnormal EPU is stopped and the output of the normal EPU is automatically controlled by the abnormality stop processing and the correction increase processing. Thereby, it is possible to stabilize the attitude of the eVTOL 10. For example, unlike the present embodiment, in a configuration in which a normal EPU located diagonally to the abnormal EPU is stopped together with the abnormal EPU, there is a concern that the overall output of the eVTOL 10 may be insufficient. On the other hand, in the present embodiment, since the normal EPU located diagonally opposite to the abnormal EPU is not stopped, a safer control option can be provided from the viewpoint of maintaining the altitude, the speed, and the redundancy of the eVTOL 10.

In the present embodiment, the abnormal stop processing and the correction increase processing are automatically started without the pilot's involvement. However, there is a possibility that stopping the abnormal EPU and increasing the output of the normal EPU through the abnormal stop processing and the correction increase processing is not necessarily the best safety measure. Therefore, the pilot can cancel the abnormal stop processing and the correction increase processing by performing a switching operation on the operation portion 38. Therefore, it becomes possible to implement the best safety measures for the pilot. Incidentally, there are cases where the abnormal stop processing and the correction increase processing are not necessarily the best safety measures, such as when an increase in power is not necessary due to the abort of takeoff from a low altitude.

Takeoff and landing are the most demanding phases of flight for pilots, requiring special attention and strict work procedures. Therefore, in the present embodiment, it is determined whether or not the aircraft is in the takeoff and landing phase according to altitude information, speed information, and aircraft configuration, and when it is in the takeoff and landing phase, the abnormal stop processing and correction increase processing are automatically started. Therefore, it is possible to automate troubleshooting that increases the complexity of flight procedures for pilots, and reduce the pilot's workload, which can lead to human errors.

According to the embodiment described so far, in FIG. 1, when the abnormality occurs in the EPU 50A, the EPU 50A is stopped as an abnormal EPU by the abnormal stop processing, while the output of the EPUs 50B1 and 50B2 is increased as normal EPUs through the correction increase processing. With this configuration, even if the overall output of the eVTOL 10 decreases due to the drive stop of the EPU 50A, it is possible to compensate for the decrease of the EPU 50A by increasing the output of the EPUs 50B1 and 50B2. Moreover, in the correction increase processing, the outputs of the EPUs 50B1 and 50B2 are increased so as to correct the change in the attitude of the eVTOL 10 due to the drive stop of the EPU 50A. For this reason, it is possible to suppress the attitude of the eVTOL 10 from becoming unstable due to the drive stop of the EPU 50A. Therefore, the safety can be improved when the EPU abnormality occurs in the eVTOL 10.

According to the present embodiment, among the plurality of normal EPUs, the EPUs 50B1 and 50B2 that are closest to the EPU 50A are regarded as recent EPUs, and their output is increased by the correction increase processing. With this configuration, in the eVTOL 10, even if the output around the EPU 50A decreases due to the drive stop of the EPU 50A, the decrease in the output around the EPU 50A can be compensated for by increasing the output of the EPUs 50B1 and 50B2. Therefore, in the eVTOL 10, it is possible to prevent the overall output from becoming unbalanced due to a decrease in the output of some parts.

According to the present embodiment, among the plurality of normal EPUs, the EPUs 50B1 and 50B2 that are adjacent to the EPU 50A in the circumferential direction of the yaw axis AZ are treated as adjacent EPUs, and their output is increased by the correction increase processing. With this configuration, in the eVTOL 10, even if the output of the EPU 50A decreases due to the drive stop of the EPU 50A, the decrease in the output of the EPU 50A can be compensated for by increasing the output of the EPUs 50B1 and 50B2. Therefore, in the eVTOL 10, by reducing the output on the EPU 50A side, it is possible to prevent the output balance from collapsing in at least one of the roll direction and the pitch direction. Therefore, the attitude of the eVTOL 10 can be stabilized, for example, in the roll direction and the pitch direction.

According to the present embodiment, when the flight phase of the eVTOL 10 is the takeoff phase, the EPU 50A in which an abnormality has occurred is stopped by the abnormality stop processing. In the takeoff phase, the output of the normal EPUs 50B1 and 50B2 is increased by the correction increase processing in conjunction with the drive stop due to the abnormal stop processing. Therefore, even if the abnormality occurs in the EPU 50A in the eVTOL 10 during vertical takeoff, it is possible to prevent both the overall output of the eVTOL 10 from being insufficient due to the drive stop of the EPU 50A, and the attitude of the eVTOL 10 from becoming unstable.

Maneuvering for vertical takeoff of the eVTOL 10 tends to place a heavy workload on the pilot. In contrast, in the present embodiment, when the flight phase of the eVTOL 10 is the takeoff phase, the EPU 50A, which is the abnormal EPU, is automatically stopped by the abnormal stop processing. With this configuration, there is no need for the pilot to manually perform the abnormal stop processing and the correction increase processing, so it is possible to suppress the pilot's workload from becoming even higher due to the EPU abnormality that occurs during vertical takeoff. Therefore, in the eVTOL 10, it is possible to reduce the risk that safety will deteriorate due to an excessively high workload on the pilot during vertical takeoff.

According to the present embodiment, when the flight phase of the eVTOL 10 is the takeoff phase, the vertical takeoff of the eVTOL 10 is stopped and the vertical landing is performed while the abnormal stop processing and the correction increase processing are being performed. With this configuration, the eVTOL 10 can be vertically landed with enhanced safety due to the abnormal stop processing and the correction increase processing. Therefore, it is possible to improve safety when vertically landing the eVTOL 10 in which the EPU abnormality has occurred.

The operation for canceling the vertical takeoff of the eVTOL 10 and vertically landing the eVTOL 10 tends to place a heavy workload on the pilot. On the other hand, in the present embodiment, when the EPU abnormality occurs, a process of canceling the vertical takeoff of the eVTOL 10 and performing a vertical landing is automatically performed. With this configuration it is not necessary for the pilot to manually cancel the vertical takeoff and perform the vertical landing. Therefore, when the eVTOL 10 is vertically landed due to the occurrence of the EPU abnormality, it is possible to prevent the pilot's workload from becoming excessively high.

According to the present embodiment, when the eVTOL 10 performs the vertical landing, at least one of the speed and altitude of the eVTOL 10 is changed so that the flight state of the eVTOL 10 does not enter the avoidance area. With this configuration, the vertical landing of the eVTOL 10 is performed while the flight state avoids the avoidance area, so it is possible to avoid a reduction in safety during vertical landing due to the flight state being in the avoidance area.

Furthermore, when the flight state of the eVTOL 10 is in the avoidance area, at least one of the speed and altitude of the eVTOL 10 is changed so that the flight state of the eVTOL 10 moves out of the avoidance area. With this configuration, even if the eVTOL 10 unintentionally enters the avoidance area due to the EPU abnormality or the like, the eVTOL 10 can be moved out of the avoidance area. Then, by performing the evacuation landing process after the flight state of the eVTOL 10 escape from the avoidance area, safety when the eVTOL 10 performs the evacuation landing can be improved.

According to the present embodiment, when the flight phase of the eVTOL 10 is the landing phase, the EPU 50A in which an abnormality has occurred is stopped by the abnormality stop processing. In the landing phase, the output of the normal EPUs 50B1 and 50B2 is increased by the correction increase processing in conjunction with the drive stop due to the abnormal stop processing. Therefore, even if the abnormality occurs in the EPU 50A in the eVTOL 10 during vertical landing, it is possible to prevent both the overall output of the eVTOL 10 from being insufficient due to the drive stop of the EPU 50A, and the attitude of the eVTOL 10 from becoming unstable.

Maneuvering for vertically landing of the eVTOL 10 tends to place a heavy workload on the pilot. In contrast, in the present embodiment, when the flight phase of the eVTOL 10 is the landing phase, the EPU 50A, which is the abnormal EPU, is automatically stopped by the abnormal stop processing. With this configuration, there is no need for the pilot to manually perform the abnormal stop processing and the correction increase processing, so it is possible to suppress the pilot's workload from becoming even higher due to the EPU abnormality that occurs during vertical landing. Therefore, in the eVTOL 10, it is possible to reduce the risk that safety will deteriorate due to an excessively high workload on the pilot during vertical landing.

According to the present embodiment, when a switching operation is performed on the operation portion 38, both the abnormal stop processing and the correction increase processing are canceled. In this case, the pilot can perform the operation corresponding to the abnormal stop processing and the operation corresponding to the correction increase processing as appropriate depending on the flight state of the eVTOL 10 and the like. Therefore, it becomes possible to improve the safety of the eVTOL 10 through the pilot's operation.

According to the present embodiment, the eVTOL 10 is an electric aircraft including the rotor 20 and the EPU 50. Therefore, it is easy to realize a configuration that increases the safety of the eVTOL 10 through the abnormal stop processing and the correction increase processing.

Second Embodiment

In the second embodiment, the correction increase processing is performed in accordance with the attitude of the eVTOL 10. Configurations, operations, and effects not particularly described in the second embodiment are the same as those in the first embodiment. In the second embodiment, differences from the first embodiment will be mainly described.

Figure 13:
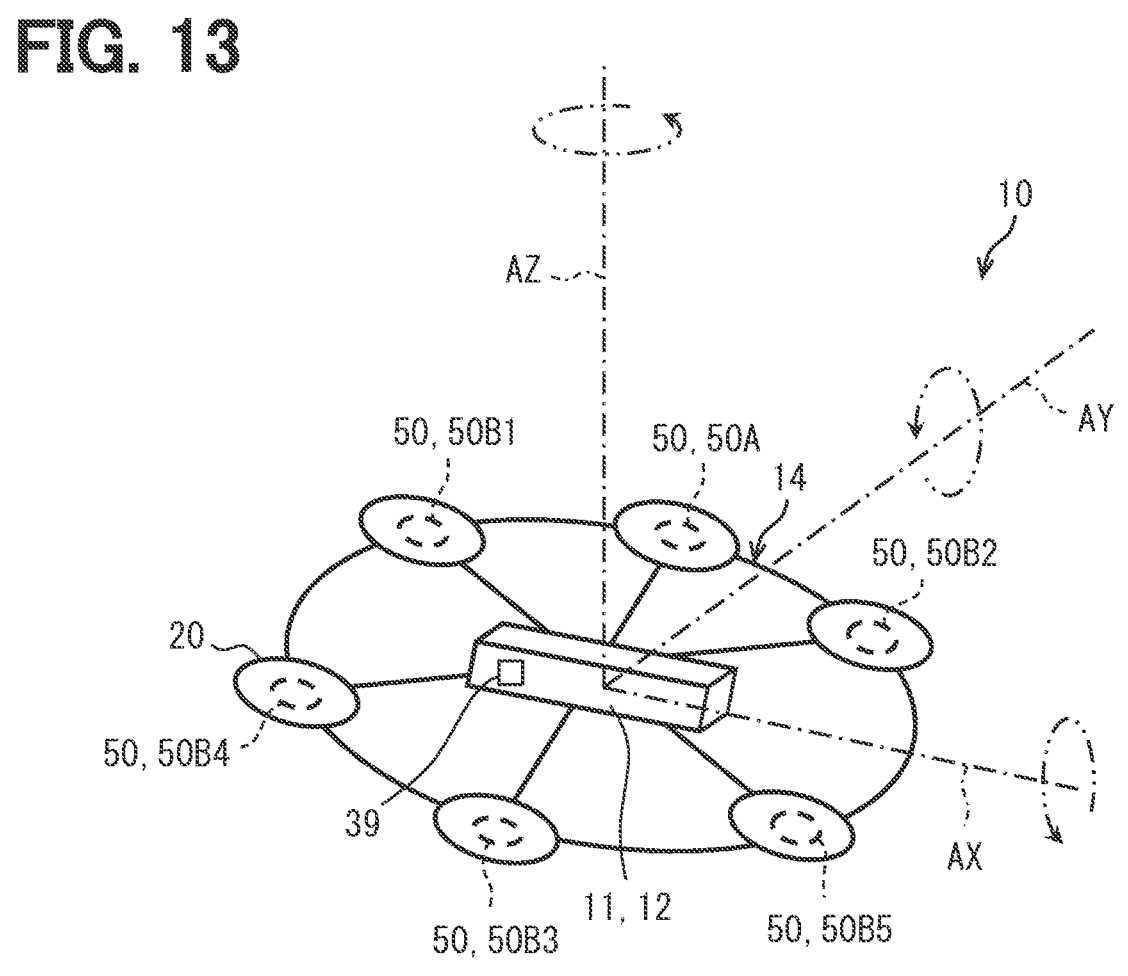

The eVTOL 10 shown in FIG. 13 has a gyro sensor 39. The gyro sensor 39 is included in the flight system 30 and is provided in the airframe 11, for example. The gyro sensor 39 includes, for example, an angular velocity sensor, and detects the angular velocity occurring in the eVTOL 10. The gyro sensor 39 detects the angular velocity of the eVTOL 10 in each of the pitch direction, roll direction, and yaw direction, for example. The gyro sensor 39 is electrically connected to the flight control device 40 and outputs a detection signal to the flight control device 40. The flight control device 40 acquires a detection result of the gyro sensor 39 as angular velocity information.

The flight control device 40 performs the correction increase processing using the detection result of the gyro sensor 39. This correction increase processing is performed in each of the takeoff processing, the landing processing, the cruise processing, and the hover processing. In the present embodiment, the correction increase processing performed, for example, during the takeoff processing will be described. The correction increase processing will be explained with reference to the flowchart of FIG. 12.

Figure 12:
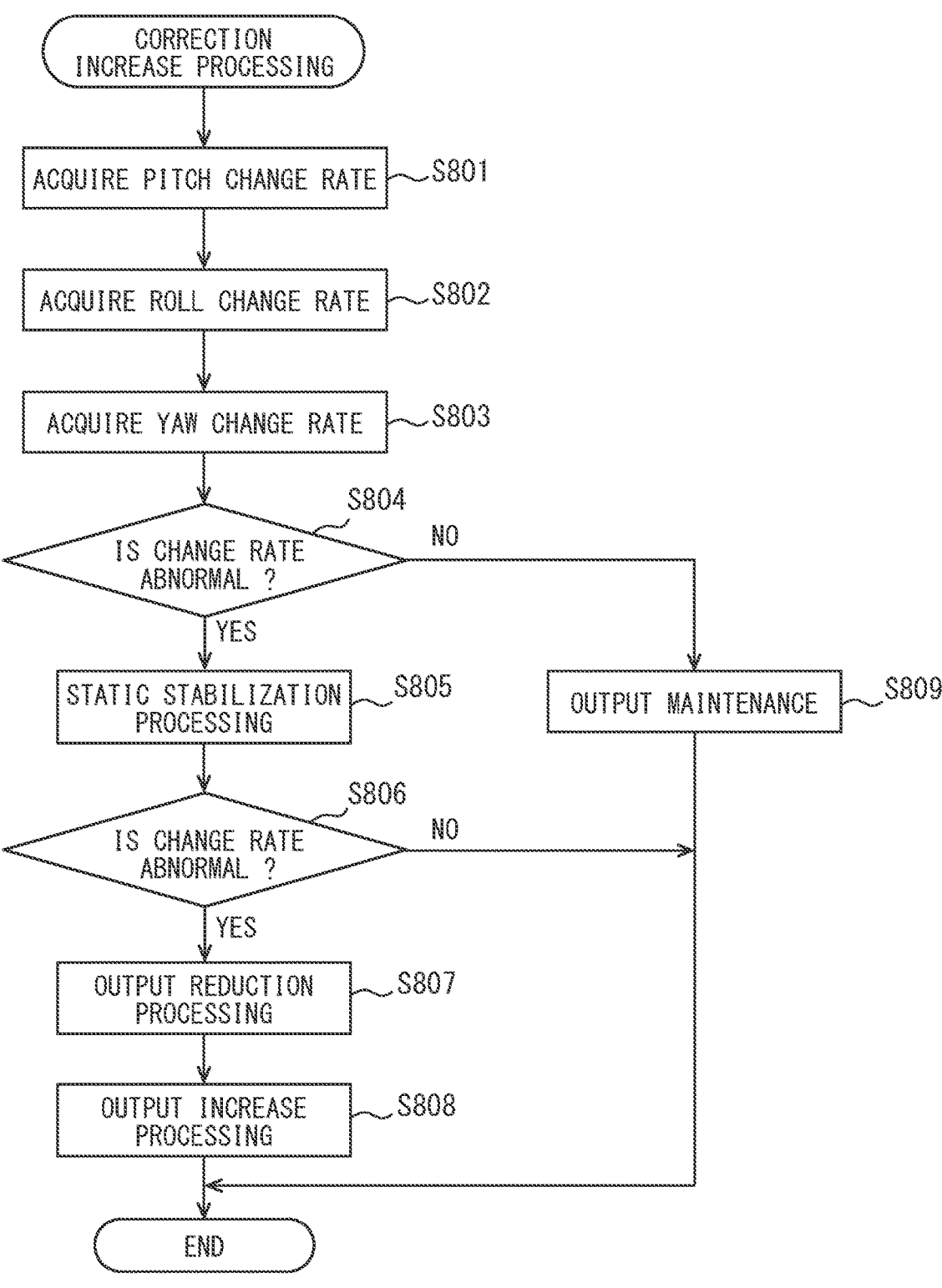
FIG. 12 is a flowchart showing a procedure of correction increase processing according to a second embodiment.

The flight control device 40 acquires a pitch change rate using the detection signal of the gyro sensor 39 in step S801 shown in FIG. 12. In the eVTOL 10, the rotational motion is generated in the circumferential direction of the pitch axis AY due to the difference in lift between the front and rear of the airframe via the pitch axis AY, so that the angular velocity changes in the pitch direction. The pitch change rate is a degree of change in angular velocity when the eVTOL 10 rotates in the pitch direction. The pitch change rate is the amount of change in angular velocity in the pitch direction per unit time. For example, the larger the pitch change rate, the larger the attitude change of the eVTOL 10 in the pitch direction.

The flight control device 40 acquires the roll change rate using the detection signal of the gyro sensor 39 in step S802. In the eVTOL 10, the rotational movement occurs in the circumferential direction of the roll axis AX due to a difference in rotational force in the circumferential direction of the roll axis AX, so that the angular velocity changes in the roll direction. The roll change rate is the degree of change in angular velocity when the eVTOL 10 rotates in the roll direction. The roll change rate is the amount of change in angular velocity in the roll direction per unit time. For example, the larger the roll change rate, the larger the attitude change of the eVTOL 10 in the roll direction.

The flight control device 40 acquires the yaw change rate using the detection signal of the gyro sensor 39 in step S803. In the eVTOL 10, the rotational movement is generated in the circumferential direction of the yaw axis AZ due to the lift force difference between the left and right sides of the airframe via the yaw axis AZ, so that the angular velocity changes in the yaw direction. The yaw change rate is the degree of change in angular velocity when the eVTOL 10 rotates in the yaw direction. The yaw change rate is the amount of change in angular velocity in the yaw direction per unit time. For example, the larger the yaw change rate, the larger the attitude change of the eVTOL 10 in the yaw direction.

The flight control device 40 determines whether the change rate is abnormal in step S804. In this determination, it is determined whether or not each of the roll change rate, the pitch change rate, and the yaw change rate is included in the allowable range. In this determination, when any one of the roll change rate, the pitch change rate, and the yaw change rate is out of the allowable range, the change rate is determined to be abnormal. This allowable range is individually set for each of the roll change rate, the pitch change rate, and the yaw change rate. The allowable range of the change rate is determined in advance and stored in the storage device 35. The allowable range of the change rate may be variably set depending on the weight of the eVTOL 10, weather information, and the like.

When the change rate is not abnormal, the flight control device 40 proceeds to step S809 and performs an output maintenance processing. Examples of cases where the change rate is not abnormal include a case where the attitude of the eVTOL 10 is stable without shaking in a state in which the abnormal EPU is stopped by the abnormal stop processing during takeoff processing.

When the change rate is abnormal, the flight control device 40 proceeds to step S805 and performs a static stabilization processing. In this static stabilization processing, the output of each of the plurality of normal EPUs is adjusted using a combination that provides the most statically stable attitude of the eVTOL 10. The flight control device 40 increases and adjusts the output of each of the plurality of normal EPUs to achieve this combination. The information regarding this combination is determined in advance and stored in the storage device 35. For example, in FIG. 13, for each case where the abnormal EPU is one of the EPUs 50A and 50B1 to 50B5, the storage device 35 stores information regarding the combination that provides the most statically stable attitude of the eVTOL 10.

After the static stabilization processing, the flight control device 40 proceeds to step S806 and again determines whether the change rate is abnormal. This determination is performed in the same manner as the determination in step

S804. When it is determined in step S806 that the change rate is abnormal, the flight control device 40 proceeds to step S807, assuming that the abnormality in the change rate of angular velocity will not be improved even if the static stabilization processing is performed. The flight control device 40 performs an additional stabilization processing in steps S807 and S808. In this additional stabilization processing, the output of the normal EPU is additionally adjusted.

The flight control device 40 performs an output reduction processing in step S807 of the additional stabilization processing. In this output reduction processing, an abnormal direction in which the change rate is abnormal among the pitch direction, the roll direction, and the yaw direction is identified, and the output of one of the two normal EPUs lined up in the abnormal direction is reduced. For example, of the two normal EPUs lined up in the pitch direction, the flight control device 40 reduces the output of the normal EPU whose rate of change in upward angular velocity is larger than the allowable range.

The flight control device 40 performs the output increase processing in step S808. In this output increase processing, among the two normal EPUs lined up in the abnormal direction, the output of the normal EPU that is not the normal EPU whose output has been reduced is reduced. For example, of the two normal EPUs lined up in the pitch direction, the flight control device 40 increases the output of the normal EPU whose rate of change in downward angular velocity is larger than the allowable range. A normal EPU whose output has been decreased by the output reduction processing and a normal EPU whose output has been increased by the output increase processing are, for example, located diagonally to each other.

Third Embodiment

In the third embodiment, when the EPU abnormality occurs, a correction reduction processing is performed in addition to the abnormality stop processing and the correction increase processing. Configurations, operations, and effects not particularly described in the third embodiment are the same as those in the first embodiment. In the third embodiment, differences from the first embodiment will be mainly described.

Figure 14:
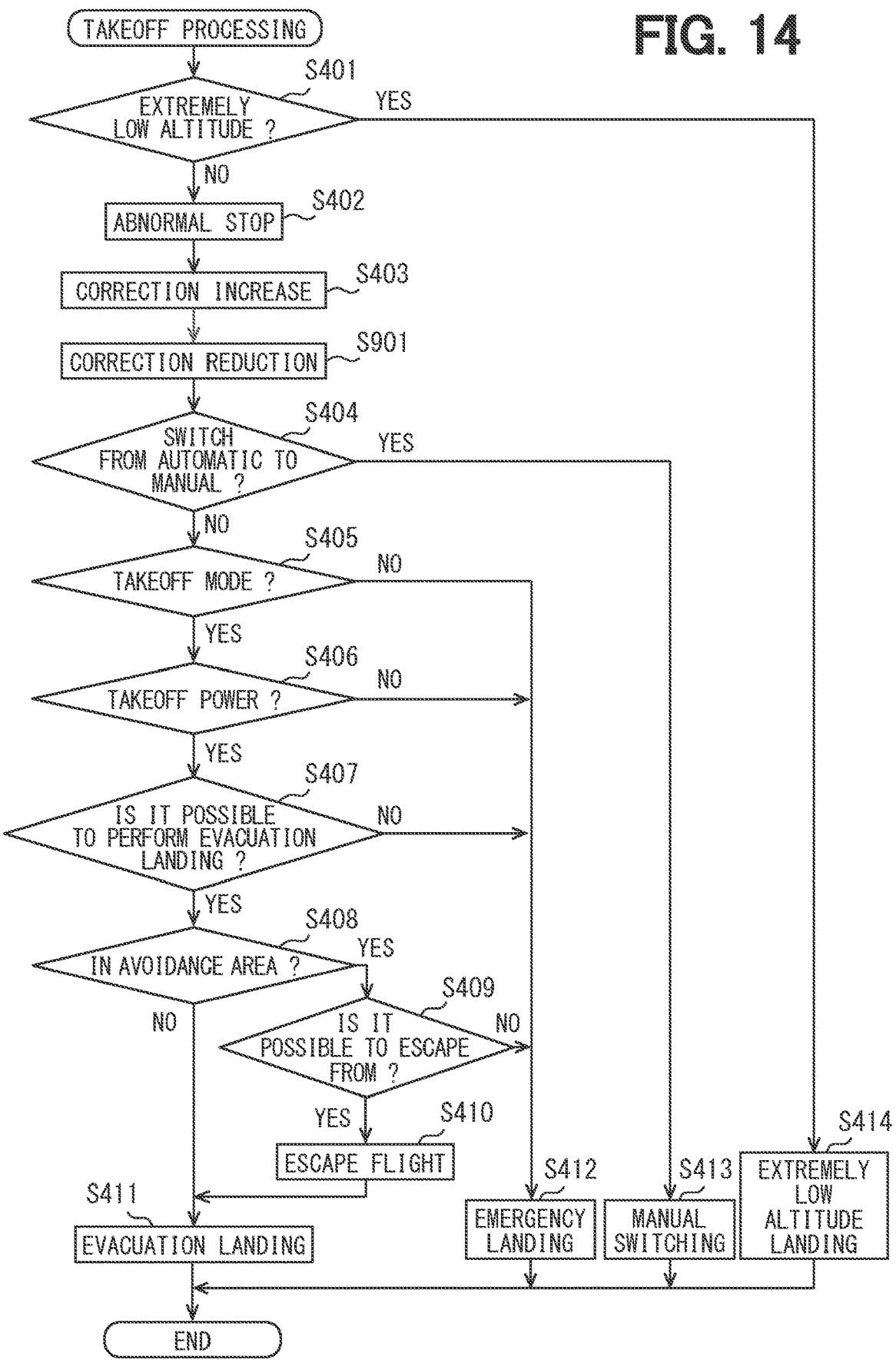
FIG. 14 is a flowchart showing a procedure of takeoff processing according to a third embodiment.

The flight control device 40 is capable of performing the correction reduction processing. In the correction reduction processing, when the drive of the abnormal EPU is stopped, the output of at least one normal EPU is reduced so as to correct the attitude change of the eVTOL 10 that occurs due to the drive stop of the abnormal EPU. This correction reduction processing is performed in each of the takeoff processing, the landing processing, the cruise processing, and the hovering processing. In the present embodiment, the correction reduction processing performed during the takeoff processing will be described. The takeoff processing will be explained with reference to the flowchart in FIG. 14.

The flight control device 40 performs the abnormal stop processing and the correction increase processing in steps S402 and S403 during the takeoff processing, and then proceeds to step S901. The flight control device 40 performs the correction reduction processing in step S901. In the correction reduction processing, for example, the output of the normal EPU located farthest from the abnormal EPU is reduced.

For example, in FIG. 1, when the abnormal EPU is the EPU 50A, the EPU 50B3, which is diagonally opposite to the EPU 50A via the yaw axis AZ, is the farthest from the EPU 50A. Therefore, in the eVTOL 10, the output of the EPU 50B3 is decreased and the outputs of the EPUs 50B1 and 50B2 are increased so as to correct the change in attitude of the eVTOL 10 due to the drive stop of the EPU 50A. In this case, in the correction increase processing, the amount of increase in the output of the EPUs 50B1 and 50B2 is set so that the entire output of the eVTOL 10 is within the allowable range. Therefore, even if the correction reduction processing is performed, it is possible to prevent the overall output of the eVTOL 10 from becoming insufficient.

Other Embodiments

The disclosure in the present description is not limited to the exemplary embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure includes components and elements omitted from the embodiments. The disclosure includes the replacement or combination of components, elements between one embodiment and other embodiments. The disclosed technical scope is not limited to the description of the embodiments. The disclosed technical scope is indicated by the description of the claims, and should be construed to include all changes within the meaning and range equivalent to the description of the claims.

In each of the above embodiments, in the correction increase processing, when increasing the output of the normal EPU, the drive voltage of the normal EPU may be increased. For example, in the correction increase processing, the drive voltage of the normal EPU is increased by a predetermined voltage. The predetermined voltage may be, for example, a voltage that is increased by the same proportion as the output increase rate of the normal EPU with respect to the drive voltage of the normal EPU. The predetermined voltage may be a predetermined value, or may be variably set depending on, for example, the flight speed of the eVTOL 10. In this way, increasing the drive voltage of the normal EPU makes it easier to increase the output of the normal EPU. Further, it is possible to suppress loss while increasing the output of the normal EPU. Therefore, the flight distance of the eVTOL 10 can be extended.

The EPU 50 may be connected to the drive battery 31 via a converter. The converter is a voltage adjustment portion and can adjust the drive voltage applied from the drive battery 31 to the EPU 50. The flight control device 40 is electrically connected to the converter and can control the converter. In the correction increase processing, the flight control device 40 controls the converter so that the drive voltage of the normal EPU becomes high.

In each of the above embodiments, the abnormal stop processing only needs to stop driving at least one abnormal EPU. Further, in the correction increase processing, it is sufficient that the output of at least one normal EPU is increased. In the correction increase processing, the normal EPU whose output is increased does not have to be the neighboring EPU or the recent EPU. For example, in FIG. 1, when the drive of the EPU 50A is stopped as an abnormal EPU, the outputs of the EPUs 50B4 and 50B5 among the normal EPUs may be increased.

In each of the embodiments described above, the condition for performing the abnormality stop processing and the correction increase processing only needs to include at least the occurrence of an abnormality in the EPU 50, and may or may not include other conditions. The conditions for performing the abnormal stop processing and the correction increase processing may include, for example, that the eVTOL 10 can perform the evacuation landing, that the flight state of the eVTOL 10 has escaped from the avoidance area, and the like.

In each of the embodiments described above, a plurality of rotors 20 and EPUs 50 do not need to be arranged in the circumferential direction of the yaw axis AZ. In this configuration, the EPU 50 located closest to the abnormal EPU among the plurality of normal EPUs is the most recent EPU.

In the embodiments described above, the vertical take-off and landing aircraft on which the flight control device 40 is mounted may be an electric-powered vertical take-off and landing aircraft in which at least one rotor 20 is driven by at least one EPU 50. For example, one rotor 20 may be driven by multiple EPUs 50, or multiple rotors 20 may be driven by one EPU 50.

In the embodiments described above, the flight vehicle on which the flight control device 40 is mounted may not be a vertical take-off and landing aircraft as long as the flight vehicle is electric-powered. For example, the flight vehicle may be an electric aircraft capable of taking off and landing while gliding. Further, the flight vehicle may be a rotary-wing aircraft or a fixed-wing aircraft. The flight vehicle may be an unmanned flight vehicle that does not carry people, or a manned flight vehicle that carries people.

In the embodiments described above, the flight control device 40 is implemented by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units (gate circuits). The digital circuit may include a memory in which at least one of a program and data is stored. The computer may be implemented by an analog circuit. The computer may be provided by a combination of a digital circuit and an analog circuit.

(ii) The hardware processor may be at least one processor core that executes a program stored in at least one memory. In this case, the computer is implemented by at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of the hardware logic circuit (i) and the processor core (ii). The logic circuit (i) and the processor core (ii) are disposed on different chips or a common chip.

That is, at least one of means and functions provided by the flight control device 40 can be provided by hardware alone, software alone, or a combination thereof.

What is claimed is:

1. A control device for a vertical takeoff and landing aircraft that includes a plurality of rotary blades and a plurality of drive devices that drive and rotate the rotary blades, the control device comprising a non-transitory computer-readable memory and at least one processor programmed to:

stop an abnormal device, which is a drive device among the plurality of drive devices in which an abnormality has occurred;

increase an output of at least one normal device, which is a drive device among the plurality of drive devices in which no abnormality has occurred, so as to correct an attitude change of the vertical takeoff and landing aircraft due to the stop of the abnormal device by; and not cause the increase in the output of the at least one normal device when the abnormality has occurred in the abnormal device and an altitude of the vertical takeoff and landing aircraft does not exceed a pre-determined altitude.

2. The control device for the vertical takeoff and landing aircraft according to claim 1, wherein the at least one processor is further programmed to stop the abnormal device when the abnormality occurs while a flight phase of the vertical takeoff and landing aircraft is a takeoff phase in which a vertical takeoff is performed.

3. The control device for the vertical takeoff and landing aircraft according to claim 1, wherein the at least one processor is further programmed to stop the abnormal device when the abnormality occurs while a flight phase of the vertical takeoff and landing aircraft is a landing phase in which a vertical landing is performed.

4. The control device for the vertical takeoff and landing aircraft according to claim 1, wherein the at least one normal device includes devices located closest to the abnormal device among the plurality of drive devices.

5. The control device for the vertical takeoff and landing aircraft according to claim 1, wherein the at least one normal device includes devices among the plurality of drive devices that are adjacent to the abnormal device in a circumferential direction of a yaw axis of the vertical takeoff and landing aircraft.

6. The control device for the vertical takeoff and landing aircraft according to claim 1, wherein the processor is further programmed to cause a flight mode to leave an avoidance mode by changing at least one of a speed and the altitude of the vertical takeoff and landing aircraft when the vertical takeoff and landing aircraft falls under speed and altitude specified by the avoidance mode, and vertically land the vertical takeoff and landing aircraft after the flight mode leaves the avoidance mode.

7. The control device for the vertical takeoff and landing aircraft according to claim 1, wherein the processor is further programmed to cancel each of the stopping of the abnormal device and the increase in the output of the at least one normal device when a canceling operation is performed on an operation portion.

8. The control device for the vertical takeoff and landing aircraft according to claim 1, wherein the at least one processor is further programmed to:

when the abnormality has occurred in the abnormal device and the altitude of the vertical takeoff and landing aircraft is extremely low, (i) not cause the increase in the output of the at least one normal device and (ii) not stop the abnormal device during a takeoff process of the aircraft; and stop the abnormal device when the abnormality has occurred and the altitude of the vertical takeoff and landing aircraft is not extremely low.

9. A non-transitory computer-readable storage medium storing a control program for a vertical takeoff and landing aircraft that includes a plurality of rotary blades and a plurality of drive devices that drive and rotate the rotary blades, the control program, when executed by a processor, causing the processor to:

stop an abnormal device, which is a drive device among the plurality of drive devices in which an abnormality has occurred;

increase an output of at least one normal device, which is a drive device among the plurality of drive devices in which no abnormality has occurred, so as to correct an attitude change of the vertical takeoff and landing aircraft due to the stop of the abnormal device; and not cause the increase in the output of the at least one normal device when the abnormality has occurred in the abnormal device and an altitude of the vertical takeoff and landing aircraft does not exceed a pre-determined altitude.

10. The non-transitory computer-readable storage medium according to claim 9, wherein the control program causes the processor to:

when the abnormality has occurred in the abnormal device and the altitude of the vertical takeoff and landing aircraft is extremely low, (i) not cause the increase in the output of the at least one normal device and (ii) not stop the abnormal device during a takeoff process of the aircraft; and stop the abnormal device when the abnormality has occurred and the altitude of the vertical takeoff and landing aircraft is not extremely low.

11. A method of controlling a vertical takeoff and landing aircraft that includes a plurality of rotary blades and a plurality of drive devices that drive and rotate the rotary blades, the method comprising:

stopping an abnormal device, which is a drive device among the plurality of drive devices in which an abnormality has occurred;

increasing an output of at least one normal device, which is a drive device among the plurality of drive devices in which no abnormality has occurred, so as to correct an attitude change of the vertical takeoff and landing aircraft due to the stop of the abnormal device; and not causing the increase in the output of the at least one normal device when the abnormality has occurred in the abnormal device and an altitude of the vertical takeoff and landing aircraft does not exceed a prede-termined altitude.

* * * * *